(12) United States Patent
  Klemm

(10) Patent No.: US 12,604,168 B2
(45) Date of Patent: Apr. 14, 2026

(54) EMERGENCY MANAGEMENT SYSTEM AND METHOD

(71) Applicant: Sanofi, Paris (FR)

(72) Inventor: Thomas Klemm, Frankfurt am Main (DE)

(73) Assignee: Sanofi, Paris (FR)

( * ) Notice: Subject to any disclaimer, the term of this patent is extended or adjusted under 35 U.S.C. 154(b) by 0 days.

(21) Appl. No.: 17/771,861

(22) PCT Filed: Nov. 2, 2020

(86) PCT No.: PCT/EP2020/080644
  § 371 (c)(1),
  (2) Date: Apr. 26, 2022

(87) PCT Pub. No.: WO2021/089463
  PCT Pub. Date: May 14, 2021

(65) Prior Publication Data
  US 2022/0377523 A1     Nov. 24, 2022

(30) Foreign Application Priority Data
  Nov. 6, 2019   (EP) ..................................... 19306434

(51) Int. Cl.
  *G08B 21/02*     (2006.01)
  *H04W 4/90*     (2018.01)
  *G08B 21/04*     (2006.01)
(52) U.S. Cl.
  CPC ........... *H04W 4/90* (2018.02); *G08B 21/0446* (2013.01)
(58) Field of Classification Search
  CPC ............................. H04W 4/90; G08B 21/0446
  See application file for complete search history.

(56) References Cited

U.S. PATENT DOCUMENTS

| | | | | | |
|---|---|---|---|---|---|
| 5,865,786 | A | * | 2/1999 | Sibalis | ................... A61N 1/044 604/20 |
| 6,039,251 | A | * | 3/2000 | Holowko | ............... G16H 10/65 235/375 |

(Continued)

FOREIGN PATENT DOCUMENTS

| | | |
|---|---|---|
| CN | 108476395 A | 8/2018 |
| CN | 108717678 A | 10/2018 |

(Continued)

OTHER PUBLICATIONS

International Preliminary Report on Patentability in International Appln. No. PCT/EP2020/080644, mailed May 19, 2022, 14 pages.

(Continued)

*Primary Examiner* — Quang Pham
(74) *Attorney, Agent, or Firm* — Fish & Richardson P.C.

(57) ABSTRACT

The present disclosure relates to an emergency management system configured to initiate an emergency request: the emergency management system comprising:
  a personal computing device configured to gather vital data of a user, the personal computing device comprising at least one communication interface operable to communicate with at least one of an external electronic device and an emergency service provider,
  an electronic storage configured to store personal data of the user,
  at least one processor connectable to the electronic storage, the at least one processor being operable:
  to derive an emergency level indicator on the basis of the personal data and the gathered vital data, and
  to generate an emergency request and to transmit the emergency request to the emergency service provider on the basis of the emergency level indicator.

20 Claims, 5 Drawing Sheets

300

(56) References Cited

U.S. PATENT DOCUMENTS

| | | | | |
|---|---|---|---|---|
| 7,894,794 B2* | 2/2011 | Boss | H04W 76/50 | |
| | | | 455/13.1 | |
| 8,878,889 B1* | 11/2014 | Kaupp | H04W 76/50 | |
| | | | 348/14.02 | |
| 9,852,599 B1* | 12/2017 | Slavin | A61B 7/04 | |
| 9,888,371 B1* | 2/2018 | Jacob | G08B 25/08 | |
| 9,942,739 B2* | 4/2018 | Bozik | H04M 3/5116 | |
| 9,973,611 B2* | 5/2018 | Pether | H04M 1/72415 | |
| 9,998,895 B1* | 6/2018 | Schuler | H04W 4/02 | |
| 10,212,570 B1* | 2/2019 | Ramalingam | H04W 4/025 | |
| 10,292,036 B1* | 5/2019 | Robinson | H04W 4/12 | |
| 10,299,102 B1* | 5/2019 | Suxena | H04B 17/373 | |
| 10,394,646 B1* | 8/2019 | Kaufman | G06F 11/1004 | |
| 10,403,136 B1* | 9/2019 | Grant | G08G 1/205 | |
| 10,447,865 B2* | 10/2019 | Mehta | H04W 80/04 | |
| 10,455,397 B1* | 10/2019 | Pallapa | H04W 4/90 | |
| 10,771,951 B2* | 9/2020 | Mehta | H04W 8/18 | |
| 10,835,686 B2* | 11/2020 | Sjöstedt | G06F 1/163 | |
| 11,272,346 B2* | 3/2022 | Yanamandra | H04M 1/72421 | |
| 11,383,087 B1* | 7/2022 | Heldman | G16H 20/70 | |
| 11,475,751 B1* | 10/2022 | Lee | A61B 5/7282 | |
| 11,600,274 B2* | 3/2023 | Stefanski | G10L 15/22 | |
| 11,735,317 B2* | 8/2023 | Lee | G06N 3/045 | |
| | | | 702/19 | |
| 11,763,665 B2* | 9/2023 | Gopalakrishnan | A61M 21/02 | |
| | | | 600/301 | |
| 12,010,744 B2* | 6/2024 | Roberts | H04W 4/80 | |
| 12,042,274 B2* | 7/2024 | Ringemann | G16H 50/30 | |
| 2002/0013518 A1* | 1/2002 | West | A61B 5/117 | |
| | | | 128/903 | |
| 2002/0169635 A1* | 11/2002 | Shillingburg | G16H 20/13 | |
| | | | 705/2 | |
| 2003/0179094 A1* | 9/2003 | Abreu | A61B 5/14532 | |
| | | | 128/920 | |
| 2004/0008219 A1* | 1/2004 | Sarel | A61B 5/0059 | |
| | | | 715/700 | |
| 2006/0132283 A1* | 6/2006 | Eberhart | G16H 40/63 | |
| | | | 382/128 | |
| 2007/0132597 A1* | 6/2007 | Rodgers | G06Q 10/10 | |
| | | | 348/E7.078 | |
| 2007/0185615 A1* | 8/2007 | Bossi | A61J 7/0084 | |
| | | | 700/244 | |
| 2008/0001735 A1* | 1/2008 | Tran | A61B 5/1118 | |
| | | | 340/539.22 | |
| 2008/0005301 A1* | 1/2008 | Li | H04M 1/72475 | |
| | | | 709/223 | |
| 2008/0021731 A1* | 1/2008 | Rodgers | G08B 21/0469 | |
| | | | 348/E7.078 | |
| 2008/0059228 A1* | 3/2008 | Bossi | G16H 30/20 | |
| | | | 705/2 | |
| 2008/0129518 A1* | 6/2008 | Carlton-Foss | G08B 25/009 | |
| | | | 379/45 | |
| 2008/0129525 A1* | 6/2008 | Barrus | G08B 25/016 | |
| | | | 340/669 | |
| 2008/0133277 A1* | 6/2008 | Jang | A61B 5/1117 | |
| | | | 705/3 | |
| 2008/0215971 A1* | 9/2008 | Gillo | A63F 13/31 | |
| | | | 709/204 | |
| 2008/0266118 A1* | 10/2008 | Pierson | A61B 5/0205 | |
| | | | 340/573.6 | |
| 2009/0322540 A1* | 12/2009 | Richardson | G08B 21/0446 | |
| | | | 340/573.7 | |
| 2009/0322548 A1* | 12/2009 | Gottlieb | G08B 21/0446 | |
| | | | 340/686.6 | |
| 2010/0007502 A1* | 1/2010 | Noury | A61B 5/1117 | |
| | | | 340/573.1 | |
| 2010/0274104 A1* | 10/2010 | Khan | A61B 5/02055 | |
| | | | 600/301 | |
| 2011/0230733 A1* | 9/2011 | Al-Ali | G16H 50/20 | |
| | | | 600/301 | |
| 2012/0052833 A1* | 3/2012 | Pendse | A63F 13/46 | |
| | | | 455/404.1 | |
| 2012/0052836 A1* | 3/2012 | Buratti | H04W 76/50 | |
| | | | 455/404.1 | |
| 2012/0053472 A1* | 3/2012 | Tran | G01S 5/10 | |
| | | | 600/509 | |
| 2013/0076523 A1* | 3/2013 | Kwan | A61B 5/1118 | |
| | | | 340/8.1 | |
| 2013/0082837 A1* | 4/2013 | Cosentino | G08B 25/016 | |
| | | | 340/539.12 | |
| 2013/0100268 A1* | 4/2013 | Mihailidis | G08B 21/02 | |
| | | | 348/77 | |
| 2013/0185097 A1* | 7/2013 | Saria | G06Q 10/00 | |
| | | | 705/3 | |
| 2013/0237776 A1* | 9/2013 | Ong | A61B 5/7264 | |
| | | | 600/301 | |
| 2013/0339019 A1* | 12/2013 | Giancarlo | G10L 15/04 | |
| | | | 704/251 | |
| 2014/0051379 A1* | 2/2014 | Ganesh | H04W 4/90 | |
| | | | 455/404.1 | |
| 2014/0051381 A1* | 2/2014 | Ginter, Jr. | H04M 3/5116 | |
| | | | 455/404.1 | |
| 2014/0099614 A1* | 4/2014 | Hu | G09B 19/00 | |
| | | | 434/236 | |
| 2014/0142979 A1* | 5/2014 | Mitsunaga | G16H 10/60 | |
| | | | 705/3 | |
| 2015/0004926 A1* | 1/2015 | AlHazme | H04M 1/72424 | |
| | | | 455/566 | |
| 2015/0022338 A1* | 1/2015 | Hwang | G06Q 10/1093 | |
| | | | 340/501 | |
| 2015/0077244 A1* | 3/2015 | Lyman | G08B 25/016 | |
| | | | 340/539.12 | |
| 2015/0087257 A1* | 3/2015 | Balram | H04W 4/90 | |
| | | | 455/404.1 | |
| 2015/0087258 A1* | 3/2015 | Barnes | H04W 4/90 | |
| | | | 455/404.2 | |
| 2015/0269825 A1* | 9/2015 | Tran | A61B 5/1113 | |
| | | | 340/539.12 | |
| 2015/0288797 A1* | 10/2015 | Vincent | G16H 10/60 | |
| | | | 455/404.2 | |
| 2015/0363986 A1* | 12/2015 | Hoyos | H04W 12/08 | |
| | | | 340/5.61 | |
| 2016/0058661 A1* | 3/2016 | Pether | A61J 7/0481 | |
| | | | 206/534 | |
| 2016/0142894 A1* | 5/2016 | Papakonstantinou | G16H 40/67 | |
| | | | 455/404.1 | |
| 2016/0307427 A1* | 10/2016 | Haflinger | G16Z 99/00 | |
| 2016/0358447 A1* | 12/2016 | Le | G08B 25/016 | |
| 2016/0364545 A1* | 12/2016 | Das | G16H 50/70 | |
| 2016/0379473 A1* | 12/2016 | Bharti | G08B 21/182 | |
| | | | 340/539.11 | |
| 2017/0083667 A1* | 3/2017 | Darrah | G16H 10/60 | |
| 2017/0094488 A1* | 3/2017 | Grice | H04W 4/90 | |
| 2017/0109474 A1* | 4/2017 | Jung | G08B 21/0446 | |
| 2017/0124835 A1* | 5/2017 | Boyina | H04M 1/72421 | |
| 2017/0132371 A1* | 5/2017 | Amarasingham | G06F 40/284 | |
| 2017/0140101 A1* | 5/2017 | Anderson | G16H 10/65 | |
| 2017/0147777 A1* | 5/2017 | Kim | G16H 50/30 | |
| 2017/0180929 A1* | 6/2017 | Cavendish | H04W 4/023 | |
| 2017/0180963 A1* | 6/2017 | Cavendish | H04W 52/0229 | |
| 2017/0213437 A1* | 7/2017 | Sundaram | G08B 21/0453 | |
| 2017/0242428 A1* | 8/2017 | Pal | A61B 5/021 | |
| 2017/0272815 A1* | 9/2017 | Yan | H04N 21/422 | |
| 2017/0325056 A1* | 11/2017 | Mehta | H04W 4/90 | |
| 2017/0325091 A1* | 11/2017 | Freeman | A61M 16/10 | |
| 2018/0025123 A1* | 1/2018 | Movva | A61B 5/1113 | |
| | | | 705/2 | |
| 2018/0174489 A1* | 6/2018 | Dellimore | G09B 23/288 | |
| 2018/0261322 A1* | 9/2018 | Cheng | A61B 5/339 | |
| 2018/0288581 A1* | 10/2018 | Bostick | H04W 4/90 | |
| 2018/0325385 A1* | 11/2018 | Deterding | G16H 50/20 | |
| 2018/0365942 A1* | 12/2018 | Molloy | A61B 5/0205 | |
| 2018/0365958 A1* | 12/2018 | Beszteri | G08B 21/0453 | |
| 2019/0001135 A1* | 1/2019 | Yoo | A61N 1/36132 | |
| 2019/0020991 A1* | 1/2019 | Hamilton | H04W 52/0209 | |
| 2019/0069155 A1* | 2/2019 | Katayama | G16H 10/60 | |
| 2019/0080527 A1* | 3/2019 | Cox | G07C 5/02 | |
| 2019/0139631 A1* | 5/2019 | Eshelman | G16H 20/00 | |
| 2019/0141507 A1* | 5/2019 | Wang | H04W 52/367 | |

(56) References Cited

U.S. PATENT DOCUMENTS

| | | | | |
|---|---|---|---|---|
| 2019/0279479 A1* | 9/2019 | Reunamaki | ........... | G08B 25/08 |
| 2019/0295398 A1* | 9/2019 | Khac | ................. | A61B 5/02438 |
| 2019/0313231 A1* | 10/2019 | Randolph | ............... | H04W 4/80 |
| 2019/0320310 A1* | 10/2019 | Horelik | ................ | H04M 3/5116 |
| 2019/0328278 A1* | 10/2019 | Zabel | .................. | A61B 5/0816 |
| 2019/0328340 A1* | 10/2019 | Yang | ................... | A61B 5/7225 |
| 2019/0362061 A1* | 11/2019 | Hirabayashi | ......... | G06F 21/604 |
| 2020/0034001 A1* | 1/2020 | Frommelt | ............. | G06F 3/0482 |
| 2020/0059776 A1* | 2/2020 | Martin | ................. | H04M 3/5116 |
| 2020/0143920 A1* | 5/2020 | Crosby | ........... | G06Q 10/06311 |
| 2020/0151841 A1* | 5/2020 | Schuler | ............... | G06Q 50/265 |
| 2020/0176114 A1* | 6/2020 | Badawi | ................. | G16H 50/20 |
| 2020/0274962 A1* | 8/2020 | Martin | ................... | H04W 4/14 |
| 2020/0275249 A1* | 8/2020 | Kim | ................. | H04W 12/0431 |
| 2020/0382286 A1* | 12/2020 | Akamandor | ........ | H04W 12/033 |
| 2020/0410984 A1* | 12/2020 | Fukuhara | ............. | G10L 15/005 |
| 2021/0049890 A1* | 2/2021 | Han | .......................... | G06N 3/08 |
| 2021/0174921 A1* | 6/2021 | Albrecht | ................ | G16H 40/20 |
| 2021/0176617 A1* | 6/2021 | Han | .................... | H04W 52/028 |
| 2021/0219909 A1* | 7/2021 | Ostrow | .................. | A61B 5/021 |
| 2021/0248893 A1* | 8/2021 | Van Dinther | ........ | G08B 25/016 |
| 2021/0267488 A1* | 9/2021 | Taghvaeeyan | ....... | A61B 5/7221 |
| 2021/0272701 A1* | 9/2021 | Jones | ..................... | G16H 10/40 |
| 2021/0287462 A1* | 9/2021 | Taylor | .................. | G07C 5/0841 |
| 2021/0314756 A1* | 10/2021 | Brooks | ................... | H04W 4/90 |
| 2021/0343132 A1* | 11/2021 | Bonser | ................. | A61B 5/0022 |
| 2021/0385638 A1* | 12/2021 | Stawiszynski | ........ | H04W 76/50 |
| 2022/0047822 A1* | 2/2022 | Vokey | ................. | A61M 15/008 |
| 2022/0377521 A1* | 11/2022 | Pang | ................. | H04M 3/42382 |
| 2023/0066525 A1* | 3/2023 | Cabanas | ............... | H04W 4/029 |
| 2024/0127078 A1* | 4/2024 | Kadkhodaie Elyaderani | .............. G16H 40/60 |

FOREIGN PATENT DOCUMENTS

| | | | | |
|---|---|---|---|---|
| CN | 109644219 A | 4/2019 | | |
| JP | 2017-211719 A | 11/2017 | | |
| JP | 2018-085079 A | 5/2018 | | |
| JP | 6592633 B1 | 10/2019 | | |
| WO | WO 2015/143085 | 9/2015 | | |
| WO | WO-2015143085 A1 * | 9/2015 | ........... | A61B 5/0022 |
| WO | WO 2017/091624 | 6/2017 | | |
| WO | WO 2017/105653 A1 | 6/2017 | | |
| WO | WO-2017091624 A1 * | 6/2017 | ........ | A61M 5/14248 |
| WO | WO 2017/172963 A1 | 10/2017 | | |
| WO | WO 2019/115358 A1 | 6/2019 | | |

OTHER PUBLICATIONS

International Search Report and Written Opinion in International Appln. No. PCT/EP2020/080644, mailed Jan. 27, 2021, 16 pages.

* cited by examiner

400

| Vital Data | | |
|---|---|---|
| Position | (X,Y,Z) | |
| Orientation | upright | |
| time since last movement | 5 seconds | |
| time since last sound | 10 seconds | |
| Heart Rate /(beats Min) | momentary HR | 85 |
| | average HR | 75 |
| Breathing Rate | momentary BR | 17 |
| | average BR | 15 |
| Blood Pressure /(mmHg) | 130/90 | |
| ..... | ...... | |

402
404
406
408
410
412
414

500

Personal Data (Status/Medication/Health)

| 502 | Age | 58 |
|---|---|---|
| 504 | Gender | Male |
| 506 | Weight | 75 kg |

| 508 | Type of Desease/ matching index /(1....10) | cardiovascular | 1 |
|---|---|---|---|
| | | metabolic | 8 |
| | | respiratory | 3 |
| | | .... | |

| 510 | prescribed medication | Name | Amount | Time |
|---|---|---|---|---|
| | | ABCD | 2 mg | 2x /day |
| | | DEFG | 3 ml | 1x/day |
| | | HIJK | 10 ml | 3x/day |
| | | ... | ... | ... |

| 512 | medication history | drug combination #1 | drug combinatio n #2 | drug combinatio n #3 | drug combinatio n #4 |
|---|---|---|---|---|---|
| 514 | emergency history | emerg. event #1 | emerg. event #2 | | |
| | | | | | |
| | .... | | | | |
| | ..... | | | | |

Fig. 5

EMERGENCY MANAGEMENT SYSTEM AND METHOD

CROSS REFERENCE TO RELATED APPLICATIONS

The present application is the national stage entry of International Patent Application No. PCT/EP2020/080644, filed on Nov. 2, 2020, and claims priority to Application No. EP 19306434.2, filed on Nov. 6, 2019, the disclosures of which are incorporated herein by reference.

Technical Field

The present disclosure relates to the field of emergency management, in particular to the field of emergency management systems. In further aspects the disclosure relates to a personal computing device, a method of initiating an emergency request and to a non-transitory computer readable storage medium for emergency management.

BACKGROUND

Users or patients suffering a chronic disease or elderly people may be confronted with an emergency situation, in which they are not capable to initiate an emergency request to an emergency service provider, such as an ambulance. For instance, such situations may arise when a person suffers a heart attack or a stroke. For patients suffering a chronic disease, such as diabetes, a hypoglycemia or hyperglycemia may develop leading to severe restrictions of a respective patient or person. In such situations it is desirable to almost immediately provide medical help. In practical situations affected persons may not be able to make an emergency call, in particular when they are unattended or when they live alone in a home environment. In such situations, an immediate emergency call would be desirable even if the affected person is unable to make such an emergency call.

On the other hand there has been reported an increased tendency that persons conduct emergency calls and require medical help from an emergency service provider even in situations, where such emergency help would not be absolutely necessary. Since emergency service providers only comprise limited resources, both in terms of equipment and personnel excessive emergency requests to an emergency service provider may lead to situations, in which the service provided is overburdened. This may lead to situations in which people in an emergency situation cannot be provided with appropriate aid or support. This problem is becoming even more serious in rural areas, where the density of emergency service providers is comparatively low compared to urban areas.

Moreover and in practice, with some emergency calls either insufficient or superfluous information is provided to the emergency service provider. Due to an eventual lack of information upon receipt of an emergency request, emergency service providers naturally tend to provide a maximum of emergency service before physically approaching a person that is seeking emergency help. There may be situations, in which equipment and/or personnel of emergency service providers is unnecessarily bound to a particular emergency site, at which such equipment or personnel is generally not required.

SUMMARY

This disclosure describes an improved emergency management system, an improved personal computing device, and an improved method of initiating emergency requests and describes a non-transitory computer readable storage medium executable by personal computing devices by way of which the precision and/or efficiency of emergency service providers can be increased or enhanced. The disclosure aims to provide immediate emergency help to users of an emergency system requesting such help. Moreover, the disclosure provides an emergency management system that is capable to precisely distinguish between different levels of emergency so as to enable an appropriate use of the available emergency resources, both in terms of emergency equipment and personnel being trained to provide emergency help.

According to a first aspect there is provided an emergency management system configured to initiate an emergency request. The emergency management system comprises a personal computing device that is configured to gather vital data of a user. The personal computing device comprises at least one communication interface that is operable to communicate with at least one of an external electronic device and an emergency service provider. The at least one communication interface is either operable to directly communicate with the emergency service provider or to indirectly communicate with the emergency service provider, e.g. via an external electronic device.

The emergency management system further comprises an electronic storage. The electronic storage is configured to store personal data of the user. The emergency management system further comprises at least one processor, typically a digital processor. The at least one processor is either a component of the personal computing device or the at least one processor is connectable to the personal computing device in a data transferring manner. The at least one processor is further connected to or is connectable to the electronic storage. In either way, the at least one processor is operable to derive or to calculate an emergency level indicator on the basis of the personal data and on the basis of the gathered vital data. On the basis of the emergency level indicator the processor is further operable to generate an emergency request. Moreover, the at least one processor is configured and operable to transmit the emergency request to the emergency service provider on the basis of the emergency level indicator.

Typically, the emergency level indicator is a direct measure of an actual emergency level. A rather low emergency level may be indicative of a non-severe emergency situation. Hence, a low emergency level may characterize an emergency situation, in which there is no life-threatening danger or mortal danger to the person seeking emergency help.

In contrast to that a high emergency level may be indicative of a severe emergency situation. Here, the user or patient of the emergency management system may be in mortal danger or life-threatening danger.

Depending on the emergency level indicator derived or calculated by the at least one processor, the emergency management system may autonomously distinguish between different emergency levels in the event, that an emergency request is received by the emergency service provider. Depending on the emergency level as indicated by the emergency level indicator the emergency service provider may take appropriate measures that are in conformity with the emergency level indicator. In this way, available resources in terms of emergency equipment as well as in terms of personnel being trained in emergency situations can be used more efficiently. In this way, individual costs for an emergency event can be reduced without a substantial decrease of the quality of the emergency service.

Deriving of the emergency level indicator includes processing at least a portion of personal data available from an electronic storage. In addition, deriving and/or calculating of the emergency level indicator includes processing of vital data gathered by the personal computing device. The vital data may represent a momentary physiological condition, a state, a movement or an orientation of a user. Deriving or calculating of the emergency level indicator makes use of both, personal data and gathered vital data of one and the same user, thus allowing to increase the precision or likelihood of determining that a particular emergency scenario is actually present. Deriving or calculating of the emergency level indicator takes into account vital data of a user and further takes into account personal data of one and the same user that is made available from the electronic storage, to which the at least one processor has access.

In the present context and with some examples the emergency level indicator represents an emergency level index. The emergency level indicator or the respective emergency level index may be represented in form of a number, which size or magnitude is indicative of a degree of the emergency situation or of the respective emergency level.

With other or further examples, the emergency level indicator or the emergency level index is represented in form of one- or multi-dimensional grid or array comprising numerous emergency categories, wherein each emergency category may be assigned with a number. Here, the respective number may be indicative of the size or magnitude of each emergency category.

Insofar, the term 'emergency level indicator' as used herein may be generally understood as an emergency level index by way of which the degree or severity of an emergency event is quantitatively described or characterized.

The vital data may be dynamically and/or continuously gathered from the user, e.g. by the help of the personal computing device. The vital data may be gathered or acquired frequently, e.g. in accordance to a prescribed gathering or acquisition schedule. Hence, the gathered vital data may be subject to dynamic changes in accordance to the physical or physiological condition of the user. The personal data may be rather static. Personal data may be indicative of a unique identifier of the respective user. The personal data may further include rather static user-related information, such as age, gender, weight, type of disease or prescribed medication.

By combining different types of data, namely personal data and vital data the emergency level indicator can be indicative of different emergency levels according to which the emergency service provider met take perspective counter-measures in a rather efficient and cost saving way.

Typically, generation of the emergency request includes the emergency level indicator. Here, the emergency level indicator is embedded in the emergency request that is communicated, e.g. transmitted to the emergency service provider. In this way, the emergency request as received by the emergency service provider is immediately indicative of the emergency level. The emergency service provider is given the possibility to distinguish between emergency requests of different emergency level.

Transmission of the emergency request to the emergency service provider is typically provided by the at least one communication interface of the personal computing device. The respective communication interface is either a wired or wireless communication interface. The personal computing device may be configured to communicate directly with the emergency service provider, e.g. via a dedicated emergency communication channel, by a communication network or via telephone. The personal computing device and/or the at least one communication interface thereof may be configured to establish a communication link with the emergency service provider either directly or indirectly.

With a direct communication link, the at least one communication interface of the personal computing device is configured to directly communicate with a corresponding communication interface of the emergency service provider. This type of communication link may be established in many different ways, e.g. via telephone, voice over IP (VoIP) or a communication network, such as the Internet. With an indirect communication, the personal computing device may be configured to establish a communication link with a separate external electronic device, wherein the external electronic device is configured to communicate with the emergency service provider.

In other examples the emergency management system may be equipped with a first personal computing device and with a second personal computing device. Among the first and second personal computing devices, only one personal computing device, e.g. the second personal computing device may be configured to set up a communication link to the emergency service provider, whereas the first personal computing device is limited to a communication with the second personal computing device.

Provided that the emergency management system comprises more than one personal computing device, e.g. a first personal computing device and a second personal computing device the electronic storage and the at least one processor may be located in one and the same or in different personal computing devices. The same is valid for emergency management systems, comprising only one or two personal computing devices, wherein at least one of the first and second personal computing devices is configured to establish a communication link to a further external electronic device, e.g. provided by a data provider or healthcare provider.

Hence, the emergency management system may be implemented in many different ways. The emergency management system may be implemented in a single personal computing device, wherein the personal computing device is configured to gather vital data of the user. Here, the electronic storage and the at least one processor are provided by the one and only personal computing device.

With other examples, wherein the emergency management system comprises two or more personal computing devices, one of the personal computing devices may be configured to gather the vital data of the user whereas another personal computing device may be equipped with the electronic storage and wherein the at least one processor may be provided by one of the mentioned personal computing devices or by another personal computing device or by an external electronic device. For the intended functionality of the emergency management system the at least one processor and the electronic storage as well as an eventual sensors for detecting or acquiring the vital data may be provided in a distributed environment of numerous personal computing devices or external electronic devices as long as the electronic devices or personal computing devices mutually communicate in an appropriate way.

According to a further example generation and transmission of the emergency request includes providing of at least some of the gathered vital data and at least some of the personal data to the emergency service provider. In this way the emergency service provider is not only provided with an emergency level indicator. By submitting at least some of the gathered vital data and at least some of the personal data to the emergency service provider, rather valuable information about appropriate emergency measures can be immediately provided to the emergency service provider.

As an example, the emergency request may include physiologic parameters of the user, such as a momentary heart rate, a breathing rate, oxygen saturation and/or blood glucose level. In combination with the personal data, e.g. being indicative of a type of disease or a prescribed medication of the respective user, the emergency service provider is immediately provided with emergency related information by way of which respective counter measures can be put in place.

By way of example the emergency request may be directly indicative of a known disease of a particular person and may further include momentary vital data, such as a heart rate or breathing rate. In this way, the emergency service provider is immediately provided with valuable information that might be highly relevant to provide a situation-specific and appropriate emergency service.

According to another example deriving of the emergency level indicator comprises a probabilistic analysis of gathered vital data on the basis of the personal data. Moreover and as a further alternative deriving of the emergency level indicator comprises a probabilistic analysis of the personal data on the basis of the gathered vital data. In still another example deriving of the emergency level indicator comprises a probabilistic analysis of both, the gathered vital data and of the personal data. The probabilistic analysis may be based on heuristic approach or heuristic exploitation of personal data and/or of gathered vital data.

For instance, a dynamic variation of a heart rate in combination with an abrupt variation of a breathing rate may be indicative of a heart attack. This is even more likely to occur with patients suffering a cardiovascular disease or with patients that where suffering a heart attack or comparable cardiovascular issues in the near past or far past. Hence, with a comparatively young person with an average weight a particular dynamic change of a heartrate and/or breathing rate is less probable to represent a heart attack compared to an elderly person with overweight and suffering numerous cardiovascular events in the near past.

Insofar, the emergency management system may be provided with a probabilistic analysis extracted from a comparatively huge medical data set being indicative that e.g. a person of a particular gender, age group and weight has a certain probability to suffer a particular disease or emergency situation compared to other persons of a different age group, gender or weight. Generally, the probabilistic analysis can be conducted on any of the vital parameters and/or personal data of a user.

Taking a probabilistic analysis of gathered vital data and personal data into account, the emergency level indicator can be derived with a higher precision compared to situations, in which a probabilistic analysis of medical data is not taken into account. Insofar, the personal data may not only reflect rather static ordinary data of a user. Rather, the personal data and/or the vital data may include data representing the living habits of the person, such as percentage of sleep and activity, sports activities or stress levels of the respective user making use of the personal computing device and/or making use of the emergency management system. The more data being available to the emergency management system, the more the precision of the emergency level indicator can be increased.

With some examples, the probabilistic analysis of gathered vital data is based on a temporal average of the vital data gathered from the user. For this, the electronic storage and the at least one processor are generally operable and configured to gather vital data over time and to derive time averaged vital data of the user. Time averaged vital data of the user may be stored in the electronic storage and may be used for the probabilistic analysis to derive the emergency level indicator.

Hence, gathered vital data taken at a particular moment or during a particular time interval may be compared with long-term time averaged vital data of the same person. In this way, a rather precise determination can be provided if and in how far momentarily gathered vital data is indicative of an emergency event or not.

Exploiting time averaged vital data of the user may help to increase the precision of a recognition or determination of an emergency event. Moreover, the time averaged vital data of the user provides an individual and user specific characterization of the user's living habits. On the basis of a comparison of momentarily gathered vital data with time averaged vital data of one and the same user a rather precise estimation can be made if and in how far momentarily gathered vital data is indicative of an emergency event or not.

For instance, and when vital data is continuously gathered while the user is at rest or is asleep the average value of the vital data may be a direct indicator of the general susceptibility of the person to suffer an emergency situation.

The probabilistic analysis may combine at least a first type of vital data and a second type of vital data to derive or to estimate a momentary constitution, such as wellness or fitness of the user of the emergency management system. Just as an example, the first type of vital data may be a state of motion and the second type of vital data may be a breathing rate or heartbeat rate of the user. Here, a first average value of the first type of vital data and a second average value of the second type of vital data may be calculated over time. A ratio or a comparison of first and second average values may be derived and used as a direct indicator of the wellness or physical constitution of the user. Exploiting or using of at least a first and a second time averaged value of a first type of vital data and of a second type of vital data may be used to modify the sensitivity or susceptibility for generating an emergency request.

According to another example the personal computing device comprises at least one sensor. The at least one sensor is operable to measure at least one of the following vital parameters: heartrate, breathing rate, blood glucose level, blood pressure, electoral cardiogram (ECG), oxygen saturation, temperature, position, state of movement, orientation, acoustic feedback and/or haptic feedback. Insofar the personal computing device comprises at least one or numerous sensors by way of which at least one or several of the above mentioned vital parameters can be frequently measured or determined.

For instance, the at least one sensor may be implemented as an acceleration sensor. In this way, a movement or movement pattern of the user can be constantly monitored. Given that a user may suffer a heart attack and may inadvertently drop to ground, such a characteristic movement may be immediately detectable by the at least one sensor. In response to respective sensor signals, the at least one processor may immediately derive an emergency level indicator of a comparatively high emergency level and may immediately generate and transmit an emergency request to the emergency service provider.

Generating and/or transmitting an emergency request to the emergency service provider may be controlled by an emergency threshold. When the emergency level indicator is above the emergency threshold, the emergency request may be generated and transmitted to the emergency service provider. If the emergency level indicator is equal to or below the given emergency threshold the emergency management system may provide a different service to the user before the emergency request is generated and/or transmitted to the emergency service provider. In such situations and only by way of example the emergency management system may be configured to set up a dialog with the user, e.g. to obtain further information from the user if he or she is actually really suffering an emergency situation. The emergency threshold may vary in accordance to the personal data, in particular to probabilistic risk factors linked to the personal data. As an example, with a person suffering repeated cardiovascular issues in the near past the emergency threshold is kept at a lower level compared to a person that has never experienced a cardiovascular issue.

According to another example the personal data comprises at least one of the following data: age, gender, weight, address information, type of disease, prescribed medication, medication history, treatment history and/or emergency history. Single or numerous personal data can be combined with any one of the above-mentioned vital data by the at least one processor in order to derive an emergency level indicator. Here, a probabilistic analysis of a large set of medical data characterizing emergency situations may be provided and/or may be used for deriving the emergency level indicator.

For example and when the emergency request is further provided with personal data useful information, such as age, gender, weight, address information and type of disease as well as prescribed medication, medication history, treatment history and emergency history can be automatically provided to the emergency service provider. Compared to a conventional emergency call conducted by telephone, such information does no longer have to be communicated by voice. Moreover, in an emergency situation in which a user is actually requesting help though a telephone-based emergency call, depending on the specific situation, the user may inadvertently provide unprecise or incomplete information to the emergency service provider. Such a linguistic data acquisition by telephone is quite time-consuming and sometimes error prone. By embedding at least some of the above-mentioned personal data directly into a digitally implemented emergency request submitted by a personal computing device to the emergency service provider, emergency related and rather relevant information can be provided more precisely and non-ambiguous in a less time-consuming manner.

According to another example of the emergency management system the emergency history of the personal data may be subject to an automated update, each time the at least one processor derives an emergency level indicator and/or generates or transmits a respective emergency request to the emergency service provider. After a more or less successful completion of an emergency service provided by the emergency service provider the quality of the emergency management system may be evaluated and at least the emergency history stored as personal data may be completed and/or modified.

In this way, a kind of a self-learning algorithm may be implemented by way of which the precision of deriving or calculating of an emergency level indicator can be improved. At least one of the user or the emergency service provider may provide a respective user feedback, that may be stored either in the vital data, in the personal data of the respective user or by modifying an algorithm, according to which the at least one processor derives the emergency level indicator on the basis of the personal data and the gathered vital data.

Moreover and in this regard the emergency management system may be applicable to a large number of users, each of which making use of a personal computing device. The emergency management system may comprise a self-learning algorithm and may be subject to constant training as it is in use.

According to another example the at least one processor is configured to continuously gather the vital data so as to continuously derive the emergency level indicator. Typically, the at least one processor of the personal computing device or the at least one processor connectable to the personal computing device frequently gathers at least one or several vital data of the user, e.g. by processing signals obtained from at least one sensor of the personal computing device.

With some examples the emergency level indicator is permanently derived from the gathered vital data by taking further into account the personal data. In this way, the emergency level indicator may be permanently adjusted to the momentary physical condition, state or movement of a user. Typically, the at least one processor is configured to process more than just one vital parameter of the vital data. The at least one processor may be configured to process numeral, i.e. at least two vital parameters of the vital data in view of the available personal data.

In this way, a rather precise estimation or calculation of the emergency level indicator can be provided. If for instance a user should begin with a physical exercise, his heart rate as well as the breathing rate may increase rather simultaneously. The processor may have access to respective data or may be implemented to set the two vital parameters into correlation. In this way, a simultaneous rising of the heart rate, breathing rate and/or blood pressure is not indicative of an emergency situation. Especially if the at least one processor is provided with further signals of an acceleration of movement sensor by way of which a movement of physical activity of the user can be monitored, the at least one processor is enabled to identify, that the detected change of vital parameters due to physical activity of the user does not represent an emergency event. With other situations, e.g. when a heart rate and/or breathing rate should become subject to an abrupt change without a significant change of a state of movement of the respective user, an emergency situation or emergency event may be detected.

According to a further example the at least one processor is configured to autonomously generate and/or to autonomously transmit an emergency request to the emergency service provider when the emergency level indicator exceeds a predefined upper emergency threshold. In this way, the emergency management system is enabled to autonomously generate and to transmit an emergency request to the emergency service provider without any interaction with a user. This is of particular use when a user should be unable to actively trigger an emergency request. Such an autonomic generation and/or transmission of an emergency request to the emergency service provider may apply in situations, in the vital parameters, e.g. the heart rate and/or breathing rate as well as the blood pressure as measured or gathered by the personal computing device unequivocally represent a potentially harmful or severe and dangerous physical condition of the user.

In another example the emergency management system further comprises a user dialog system operable to enter into a dialog with the user. Here, the at least one processor is configured to initiate the user data system when the emergency level indicator exceeds a predefined lower emergency threshold. In this way, the emergency management system may deploy a multistep cascade in the process of deriving or calculating the emergency level indicator.

The user dialog system may be implemented visually and/or acoustically. The user dialog system may comprise a visual screen in combination with at least one input, such as a button or a touch sensitive area, which may be located on the screen. In addition, or as an alternative the user dialog system may comprise at least one of a speaker and a microphone thus enabling a voice-based or voice-controlled communication between the user and the personal computing device.

With numerous examples deriving or calculating of an emergency level indicator may include numerous iterations or escalation stages. In a first step a continuously gathered vital parameter may abruptly deviate from an average value. This may lead to the deriving or calculating of an emergency level indicator above a lower emergency threshold. Deriving of such an emergency level indicator may autonomously activate the user dialog system. The user dialog system may start to set up a direct communication with the user, visually and/or acoustically. In the event that the user should not react to the dialog system or in case that the user reacts inappropriately to the user dialog system the emergency level indicator may be increased.

With an increase of the emergency level indicator a subsequent iteration or escalation stage of the user dialog system may be triggered. In a first escalation stage of the user dialog system, the user dialog system may simply try to send a visual or audible request to the user. Here, the user may simply prompt that he received the request. The user may be asked by the user dialog system if he or she requires help. Depending on the reply of the user, the user dialog system may react accordingly.

In situations, in which the user explicitly demands help, the user dialog system may further prompt the user to classify a particular type of help or to specify the currently suffering issue. As long as the user will be able to communicate with the user dialog system the personal computing device may be able to provide a first aid or a respective counter-measure for the user. As an example, the user dialog system may be trained to a variety of typical emergency scenarios. For instance, with persons suffering diabetes the user dialog system may prompt the user to manually conduct a blood glucose measurement and to provide the respective blood glucose concentration if for instance the personal computing device would be unable to provide such vital parameters autonomously.

In situations, in which a blood glucose level is below a predefined range, the user dialog system may simply prompt the user to take a particular amount of dextrose. He may be that repeatedly prompted to specify if the physical condition improves or gets worse. In accordance to the user's response the dialog system may then increase or decrease the emergency level indicator. In the course of the user dialog with the user dialog system the personal computing device may repeatedly offer to the user to manually trigger an emergency call to the emergency service provider.

If, during a user dialog it should turn out, that the user starts to behave inappropriately, the user dialog system may generate and/or provide a respective indicator that the answers or reactions of the user do no longer match a predefined scheme. Accordingly, the user dialog system may increase the emergency level indicator. Once the emergency level indicator has increased to a level, e.g. above the upper emergency threshold, the emergency management system may autonomously transmit the emergency request to the emergency service provider.

Here, the emergency request may further include the content of the previous user dialog, thereby providing valuable information to the emergency service provider once the emergency request is received and processed by the emergency service provider.

According to a further example at least one of the user dialog system and the processor is operable to modify the emergency level indicator based on a response of the user in or during the user dialog. Typically, and if the user shows a normal or expected reaction during the interaction with the dialog system at least one of the dialog system and the processor will be operable to decrease the emergency level indicator. In other situations, and if the user shows an inappropriate or unexpected reaction during the interaction with the dialog system at least one of the dialog system and the processor will be operable to increase the emergency level indicator.

The user dialog system may be operable to provide numerous escalation stages. Per default and when activated, the user dialog system may be in an initial or first escalation stage. Then and in a first communication loop with the user, depending on the reaction of the user, the dialog system may either enter a second escalation stage or it may deactivate autonomously. Typically, the dialog system enters into the second escalation stage when the reaction of the user during the first communication loop is inappropriate or unexpected. Entering into the second escalation stage may be accompanied by a raising of the emergency level indicator. If the reaction of the user during the first communication loop is expected or appropriate the dialog system may automatically deactivate.

When in the second escalation stage, the user dialog system is operable to conduct a second communication loop with the user. Depending on the reaction of the user, the dialog system may enter a third escalation stage, the dialog system may return into the first escalation stage or the dialog system may deactivate. Typically, the dialog system enters into the third escalation stage when the reaction of the user during the second communication loop is inappropriate or unexpected. Again, entering into the third escalation stage may be accompanied by a further raising of the emergency level indicator. If the reaction of the user during the second communication loop is expected or appropriate the dialog system may reenter the first communication loop or may automatically deactivate.

Depending on the specific implementation of the emergency management system various numbers of escalation stages and communication loops may be implemented in the dialog system. When a final escalation stage has been reached the dialog system and/or the processor is operable to generate the emergency request.

The various escalation stages and associated communication loops may distinguish from each other by at least one of the intensity, the amplitude and strength of an acoustic, visual and/or haptic signal generated by the dialog system. With an increasing number of escalation stages and/or with an increasing number of communication loops, the intensity, amplitude or strength of perceivable signals generated by the dialog system increases.

With some examples, and depending on the reaction of the user during the first escalation stage the dialog system may skip at least one or some of the intermediate escalation stages and may directly decide to generate an emergency request. This may for instance apply, when the user does not respond to an initial request of the user dialog system during the first escalation stage or when the user's response is unreasonable to a high degree.

With some examples and upon activation of the user dialog system there is quantitatively measured or derived a difference between the emergency level indicator and the predefined lower emergency threshold. If the difference between the emergency level indicator and the predefined lower emergency threshold is below a predefined first escalation level the user dialog system will enter the first escalation stage. If the difference is above the predefined first escalation level the user dialog system will enter the second escalation stage directly upon activation of the user dialog system. If the difference is above a predefined second escalation level the user dialog system will enter the third escalation stage directly upon activation of the user dialog system. In this way, and depending on the size or magnitude of the emergency level indicator the initial escalation stage or some other lower escalation stages of the user dialog system can be skipped at the benefit of a fast and prompt generation of an emergency request.

According to another example the emergency management system further comprises a medicament delivery device. The medicament delivery device may be configured to administer a medicament to the user. The medicament delivery device may comprise at least one of an injection device, an infusion device, an infusion pump, an inhaler or the like devices by way of which a medicament can be delivered to a patient in general. The medicament delivery device for an add-on device attached thereto comprises a communication interface that is configured to communicate with the personal computing device. The communication interface of the medicament delivery device is further configured to provide data to the personal computing device that is related to a medication history.

The medicament delivery device may comprise an onboard electronic unit comprising the communication interface and further comprising a sensor arrangement configured to determine the amount of a medicament administered to the user. Typically, the medicament delivery device and/or its communication interface is configured to provide detailed information about the time or date at which a particular amount of a medicament has been administered to the user.

Some medicament delivery devices may be equipped with add-on devices or auxiliary devices, wherein the add-on or auxiliary device is equipped with the communication interface. Here, the auxiliary device may be configured to determine or to measure the amount of medicament administered by the medicament delivery device. With some examples the medicament delivery device is an injection device, such as an injection pen, e.g. for injecting a medicament, such as insulin into biological tissue of the user.

By way of the communication interface of the medicament delivery device the emergency management system can be provided with data being indicative of a medication history. In this way, the emergency management system, in particular the personal data stored in the electronic storage is indicative of the medicament administered to the user in the past. Such data about the medication history may be particularly valuable in an emergency situation to enable the emergency service provider to take the appropriate countermeasures and to avoid any complications of an emergency action with a medicament administered to the user.

With some examples the emergency management system is provided by a single personal computing device. The personal computing device comprises the electronic storage configured to store personal data of the user. The personal computing device comprises the at least one processor connected to the electronic storage. The at least one processor of the personal computing device beginning operable to derive an emergency level indicator on the basis of the personal data and the gathered vital data. Moreover, the personal computing device comprises at least one or several sensors configured to detect and/or to gather the vital data of the user. The personal computing device further comprises the communication interface being configured to directly or indirectly communicate with the emergency service provider.

With other examples the emergency management system is a distributed system comprising numerous entities, such as a personal computing device implemented as a wearable personal computing device or wearable electronic device, a second personal computing device, such as an electronic hub device being stationary or movable installed in the environment, e.g. home environment of the user. The emergency management system may further comprise an external electronic device, e.g. provided by an external service provider, e.g. by medical service provider or by an computational or electronic service provider. The external electronic device may be provided with or may have access to a database. The computational power for deriving the emergency level indicator may be provided by at least one processor of one of the first and second personal computing devices or by at least one processor of an external electronic device, e.g. of an external service provider.

In either way, the personal computing devices and the external electronic device are configured to mutually communicate. These devices comprise mutually corresponding communication interfaces.

According to another aspect the present disclosure relates to a personal computing device configured to initiate an emergency request. The personal computing device comprises a processor operable to gather and to process vital data of a person. The personal computing device further comprises an electronic storage connected to the processor and being operable to store at least one vital data and personal data of the person or user. The personal computing device further comprises at least one communication interface connected to the processor. The at least one communication interface being operable to transmit an emergency request to an emergency service provider, either directly or indirectly. The processor being operable to derive an emergency level indicator on the basis of the gathered vital data and on the basis of the personal data. The processor is further operable to generate the emergency request on the basis of the emergency indicator and to transmit the emergency request to the emergency service provider.

Typically, the personal computing device belongs to an emergency management system as described above. With some examples of the personal computing device, the entire functionality of the emergency management system may be provided by and/or embedded in the personal computing device. With other examples, in particular when the emergency management system is implemented as a distributed system or when the emergency management system comprises a distributed architecture, the personal computing device is at least configured to communicate with at least one of a further personal computing device and an external electronic device, e.g. provided by an external service provider.

Typically, the communication interface of the personal computing device is operable to set up a wireless communication link to another personal computing device and/or to the external electronic device. The communication interface of the personal computing device may be further configured to set up a wired communication link to at least one of a further personal computing device and/or to an external electronic device of an external service provider, such as a data processing center of a healthcare provider.

The personal computing device may be implemented as a wearable electronic device. The personal computing device may comprise one of a belt and a wristband for attaching the personal computing device to the body of a user. In this way and when appropriately equipped with at least one or numerous sensors the personal computing device is enabled to measure and to gather vital data of the user. With some other examples the personal computing device may be adhesively attached to the skin of the user. The personal computing device may be configured to temporally and/or permanently pierce the skin of the user, e.g. in order to determine a blood glucose level.

With some examples the personal computing device may comprise a drug delivery device. Hence, the personal computing device may include a combination of a drug delivery device configured to administer a medicament to the user and a data gathering device configured to measure and/or to gather vital data of the user.

According to another example the personal computing device comprises a speech interface configured to process a speech-based input or speech-based feedback of the user. The speech interface may be further configured to provide speech-based information to the user. Hence, the speech interface is configured to provide a spoken and audible output to the user. Typically, the speech interface may belong to a user dialog system implemented or deployed by the personal computing device. The user dialog system may comprise a natural speech recognition unit by way of which speech uttered by the user can be appropriately recognized.

The speech interface of the personal computing device may be configured to communicate with a corresponding speech interface of an external electronic device or speech recognition service of an external service provider. Typically, the onboard speech interface of the personal computing device is configured to capture a speech, uttered by the user, e.g. with the help of a microphone. The recorded speech of the user may be analyzed, e.g. transformed and/or preprocessed and may be communicated to the external service provider. In this way, the speech recognition is performed and conducted by the external service provider. Recognized text extracted from the original speech of the user may be then returned to the personal computing device. Typically, the personal computing device and/or its speech interface comprises a speaker. Text recognized from the original speech of the user may be acoustically reproduced by the speech interface and/or by the external service provider.

Typically, the speech interface either provided locally in the personal computing device or provided by an external service provider typically comprises a speech-to-text processing module using various acoustic and language models to recognize the speech input as a sequence of phonemes, a sequence of words or tokens written in one or more languages. The speech-to-text processing module may be implemented using any suitable speech recognition techniques, acoustic models, and language models, such as Hidden Markov Models, Dynamic Time Warping (DTW)-based speech recognition, and other statistical and/or analytical techniques.

By establishing a communication link between the personal computing device and the external service provider the speech-two text processing can be performed at least partially by the external service provider and/or by the personal computing device.

Providing at least a portion of the speech recognition by an external service provider is beneficial in that the quality of speech recognition may be subject to a constant improvement provided by the external service provider. For this, respective software updates at the personal computing device may not be necessary. Moreover, the speech recognition provided by the external service provider may take into account a training obtained by a large number of users all making use of one and the same external service provider. In this way, each user making use of the speech recognition as provided by the external service provider may participate from a constant improvement and self-learning algorithm e.g. implemented by the external service provider.

According to another example the personal computing device is configured as a wearable electronic device. It comprises at least one sensor operable to measure at least one of the following vital parameters: heart rate, breathing rate, blood glucose level, blood pressure, electrocardiogram (ECG), oxygen saturation, temperature, position, state of movement, orientation, acoustic feedback or haptic feedback of the user. With some examples the at least one sensor comprises a movement or acceleration sensor. With some examples the at least one sensor comprises a magnetic field sensor, capable to determine the momentary orientation of the at least one sensor and hence of the personal computing device in comparison to the ambient magnetic field.

The at least one sensor may comprise at least one or several light sources and/or electrodes to measure at least one of the following vital parameters: heart rate, breathing rate, blood glucose level, electrocardiogram, oxygen saturation and so on. In this way and when carried by the user the personal computing device is configured to frequently and/or regularly gather vital data of the user.

The personal computing device may be implemented as a fitness tracker worn at a wrist of a hand of the user. For this, the personal computing device comprises a wristband. As long as carried by the user, the personal computing device is capable to track and to monitor all physical activities of the user. Respective vital data may be processed by the at least one processor and may be combined with user specific personal data. In this way, a rather precise estimate of an emergency level indicator can be provided on a regular basis.

The personal computing device may be further implemented as a smartwatch. Moreover, with some examples already existing and/or commercially distributed personal computing devices, such as fitness trackers or smartwatches can be used as personal computing device for an emergency management system as described herein, provided that such existing answers or commercially distributed personal computing devices are provide with a respective computer program or software enabling gathering of vital data and processing of white later in combination with personal data of the respective user or person.

In order to set up the emergency management system with existing personal computing devices, such as smartwatches or fitness trackers they may be provided a supplemental personal computing device, such as a stationary or mobile hub installed in the user environment and configured to communicate with the personal computing device. The supplemental personal computing device may be provided by a mobile phone or smart phone of the respective user.

It may comprise the at least one electronic storage configured to store the personal data of the user. Moreover, the second or supplemental personal computing device may be provided with the at least one processor connected or connectable to the electronic storage. Here, the at least one processor of the second personal computing device is operable to derive the emergency level indicator on the basis of the personal data and on the basis of the vital data are gathered and/or provided by the first personal computing device. Moreover, it may be the second personal computing device, e.g. the smart phone or the personal hub of the user that is configured to generate the emergency request and to transmit the emergency request to the emergency service provider on the basis of the emergency level indicator.

Many smartwatches, smart phones or the like personal computing devices are readily equipped with an acoustic, e.g. speech-based user dialog system configured to communicate with an external service provider in order to process speech uttered by a user of the device. Hence, in order to set up a user dialog system for the present emergency management system existing hardware solutions might be used, thus keeping the costs for implementing the emergency management system on a comparatively low level. An existing or commercially distributed smart device, such as a smart phone may be transformed into a personal computing device according to the present disclosure by installing and/or deploying a respective software application, e.g. a so-called App.

According to another aspect the present disclosure relates to a method of initiating an emergency request. The method comprises the steps of gathering the vital data of a user and providing of personal data of the user from an electronic storage. The method further comprises deriving of an emergency level indicator on the basis of the personal data and the gathered vital data. The method further comprises generating an emergency request on the basis of the emergency level indicator and transmitting of the emergency request to an emergency service provider. The method of initiating the emergency request is typically implemented by an emergency management system and/or by a personal computing device as described above. Insofar, all features, properties and benefits as described above in connection with the emergency management system and the personal computing device equally apply to the method of initiating the emergency request; and vice versa.

The method can be implemented by a single personal computing device. With other examples the method is implemented by a distributed emergency management system, e.g. comprising a first and a second personal computing device and optionally comprising an external electronic device as provided by an external service provider.

Typically and with numerous examples the method includes acquisition and/or gathering of numerous vital parameters, such as heart rate, breathing rate, blood glucose level, blood pressure, electrocardiogram, oxygen saturation, temperature, position, state of movement, orientation, acoustic feedback and haptic feedback of a user on a regular basis. With some examples, the method of initiating the emergency request includes providing of personal data of the user including at least one of the following data: age, gender, weight, address information, type of disease, prescribed medication, medication history, treatment history and/or emergency history. The method includes processing of at least one of the vital data with at least one of the personal data in order to obtain and/or to derive an emergency level indicator being indicative of an eventual emergency situation the user is actually suffering.

Depending on the derived or estimated level of emergency the method may take numerous actions. When the emergency level is above a predefined upper emergency threshold the method may promptly submit the emergency request to the emergency service provider. When the emergency level is below the upper emergency threshold but above a lower emergency threshold the method may continue with a user dialog. During the user dialog typical or trained situations that are in conformity with the gathered vital data will be autonomously discussed or communicated with the user.

The user will be confronted with numerous questions and may be prompted to respond accordingly. In this way, the emergency management system helps to find out which particular issue the user actually suffers. Conducting of an automated, i.e. machine-implemented dialog with the user may be assisted by an external service provider, in particular by a database and/or by an appropriately configured dialog system.

In case of non-severe issues the emergency management system may provide first help to the user and may guide the user to help himself.

Depending on communicated vital parameters and personal data the emergency management system may to a certain extent provide a diagnosis and may autonomously instruct the user to take respective counter-measures. E.g. in the case of hypoglycaemia the user may be instructed by the emergency management system to take a particular amount of dextrose. In this way the finite personnel resources of the emergency service provider can be spared or saved accordingly.

With further examples the method of initiating the emergency request, the emergency request as generated by the system includes at least some of the gathered vital data and at least some of the personal data. This data will be submitted to the emergency service provider concurrently with the emergency request. In this way and upon receipt of the emergency request the emergency service provider is immediately provided with valuable information regarding the actual vitality of the user and relevant personal data of the user. In this way, an appropriate, highly efficient and user specific emergency help can be provided to the user.

According to another example the vital data is continuously gathered. In addition, generation and/or transmission of the emergency request is triggered autonomously on the basis of the gathered vital data, typically taking into account the personal data of the user. This is of particular benefit in rather critical or severe events, e.g. when the user is not able to manually trigger an emergency call. Use of personal data, in particular use of data such as medication history, treatment history and emergency history enables to set or to modify lower and/or upper emergency thresholds individually for each user of the emergency management system.

For instance, with users having experienced numerous emergency issues in the near past the upper emergency threshold may be set to a lower level compared to users that never experienced a critical emergency situation.

With further examples the vital data is continuously gathered and generation and/or transmission of the emergency request is triggered autonomously on the basis of the gathered vital data. In this way the method provides initiation of an emergency request even without participation of the respective user but only on the basis of vital data gathered from the user. This may be of particular benefit when the user is suffering a rather critical or severe emergency issue, in which the user is unable to trigger or to initiate an emergency request on his own.

With a further example the method of initiating the emergency request comprises the step of entering into a dialog with the user by way of a user dialog system. The user dialog system may be implemented in the personal computing device. Here, the method comprises the step of entering into the dialog with the user when the emergency level indicator exceeds a predefined lower emergency threshold. As described above in connection with the emergency management system the dialog system may enter into one of numerous predefined escalation stages. Per default and when the emergency level indicator exceeds the predefined lower threshold by less than a predefined minimum degree the user dialog system enters into an initial or first escalation stage. Then, a first communication loop will be conducted with the user. Depending on the reaction of the user during the first communication loop the dialog system then enters a second escalation stage or the dialog system deactivates autonomously.

With a further example the method comprises a step of modifying the emergency level indicator depending on a response of the user in or during the user dialog. Typically, and as described above in connection with the emergency management system the emergency level indicator will be increased if the user behaves unreasonable or unexpected in or during the user dialog. If the user behaves reasonable or in a rather expected way, the emergency level indicator will be decreased. Increase of the emergency level indicator may be accompanied by entering a further escalation stage or communication loop in the user dialog system. Decrease of the emergency level indicator may be accompanied by entering a lower escalation stage or communication loop in the user dialog system. Alternatively, a decrease of the emergency level indicator may be accompanied by an automated deactivation of the user dialog system.

According to another aspect the disclosure relates to a non-transitory computer readable storage medium storing one or more programs. The one or more programs comprise instructions, which when executed by a personal computing device cause the device to gather vital data of a user, to provide personal data of the user from an electronic storage, to derive an emergency level indicator on the basis of the personal data and the gathered vital data, to generate an emergency request on the basis of the emergency level indicator and to transmit the emergency request to an emergency service provider.

The one or more programs are implemented as computer programs. They may be installed or deployed on a first and/or on a second personal computing device of an emergency management system as described above. In addition, or alternative, the one or more programs may be installed or deployed in an external electronic device, e.g. provided by an external service provider.

Typically, the one or more programs are configured to execute the above described method of initiating an emergency request, e.g. by the help of the above mentioned emergency management system and/or with the help of the above-mentioned personal computing device. Insofar all features, benefits and properties of the emergency management system, of the personal computing device and the method of initiating the emergency request equally apply to the non-transitory computer readable storage medium and the one or more programs stored thereon.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide. Examples of insulin analogues are Gly(A21), Arg(B31), Arg(B32) human insulin (insulin glargine); Lys(B3), Glu(B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(w-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen. Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

BRIEF DESCRIPTION OF THE FIGURES

In the following, an example of an emergency management system and examples of corresponding personal computing devices configured for such an emergency management system and a respective method of initiating an emergency request are described in greater detail by making reference to the drawings.

FIG. 5 is illustrative of a data structure of personal data and FIG. 6 shows one example of a flowchart of initiating an emergency request making use of the emergency management system.

DETAILED DESCRIPTION

Figure 1:
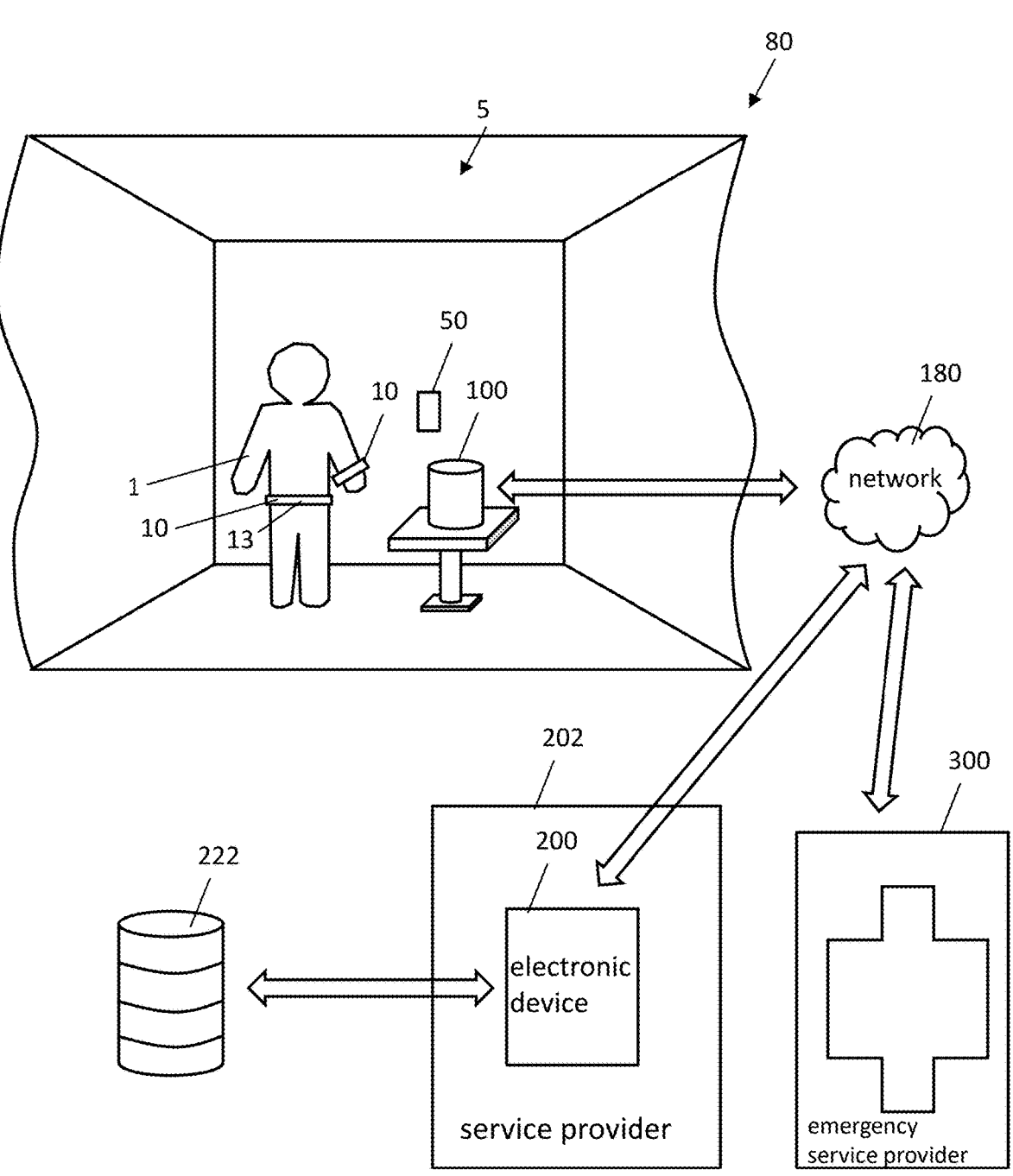
FIG. 1 schematically illustrates one example of an emergency management system.

In FIG. 1 an example of an emergency management system 80 according to the present disclosure is schematically illustrated. Here, a user 1 is equipped with at least one personal computing device 10. The personal computing device 10 may comprise a housing 11 and a collar 12 for attachment of the personal computing device 10 to a portion of a body of the user 1. With some examples and as indicated in FIG. 1, the personal computing device 10 may comprise a belt 13 allowing to attach the personal computing device 10 to a waist or hip of the person or user 1.

In FIG. 1 there is described a first personal computing device 10 in addition to a second personal computing device 100. The first personal computing device 10 may be implemented as a smart watch or as a fitness tracker worn by the user 1. The second personal computing device 100 may be implemented as a personal hub, as a personal digital assistant or as a smart phone. With some examples the second personal computing device 100 may be implemented as a personal computer or as a tablet computer. In FIG. 1 there is further illustrated a drug delivery device 50.

The drug delivery device 50 is configured to administer a pharmaceutical active substance, e.g. a medicament to the user 1. The drug delivery device 50 may be implemented as an injection device, as an infusion device, e.g. as an injection pen or as an infusion pump. With some examples the drug delivery device 50 is implemented as an inhaler.

The emergency management system 80 further comprises an external electronic device 200 provided by an external service provider 202. The external service provider 202 may be an external data provider. The external service provider 202 may have access to an electronic storage 222, e.g. implemented as a database. The implementation of an external electronic device 200 and the use of an external service provider 202 is only optional. At least one of the first and second personal computing devices 10, 100 is operable to communicate with at least one of an emergency service provider 300 and the external service provider 202, typically via a communication network 180.

In the illustrated example the first personal computing device 10 is operable to communicate wirelessly with the second personal computing device 100. Here, only the second personal computing device 100 may communicate with the emergency service provider 300 via the communication network 180. Typically, the wireless communication between the first personal computing device 10 and the second personal computing device 100 is a short range communication link.

It may be implemented by a generally available wireless communication standard, such as Bluetooth, Wi-Fi, NFC, IrDA. With some examples, the first personal computer device 10 and the second personal computing device 100 may be connected by wire. The communication network 180 may be one of a mobile phone network, a conventional phone network and the Internet. Typically, the communication network 180 is a digital communication network. With some examples, the communication network is an analog communication network.

Figure 2:
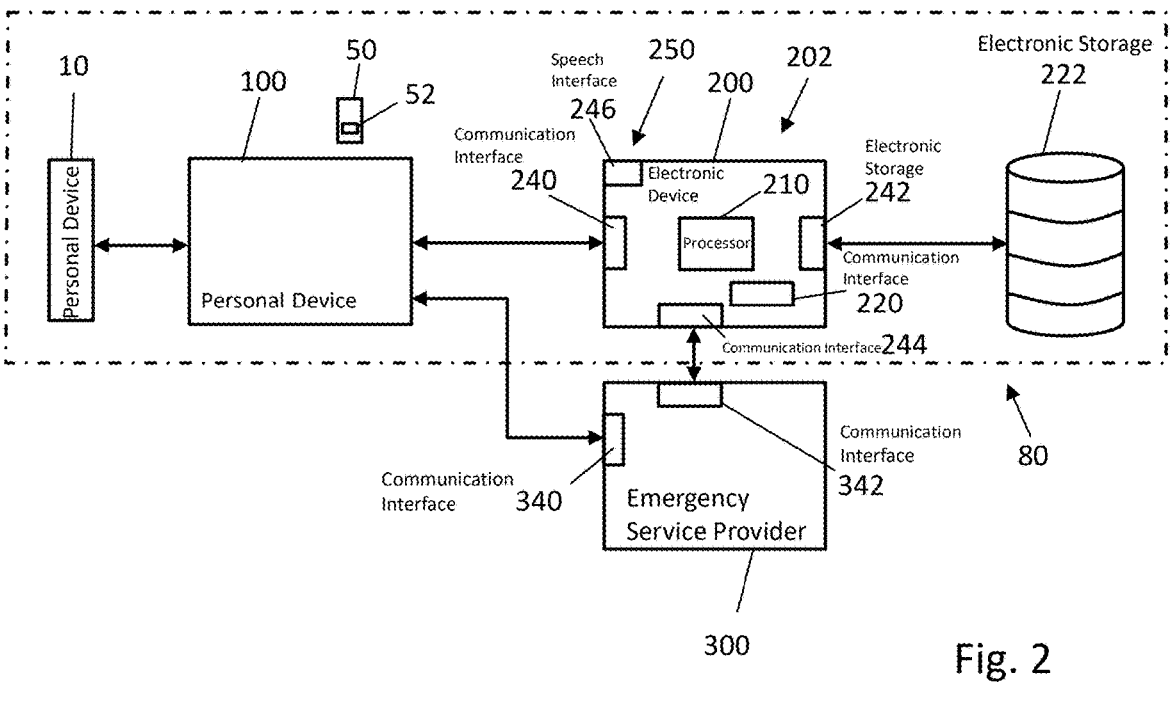
FIG. 2 shows a block diagram of the emergency management system.
Figure 3:
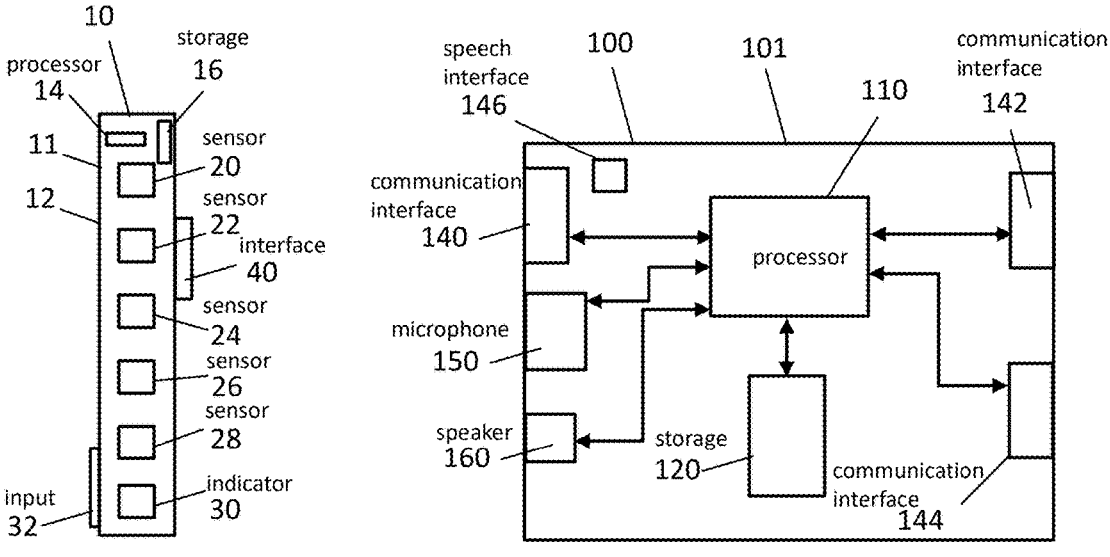
FIG. 3 shows a more detailed block diagram of a first and a second personal computing device of the emergency management system.

As illustrated in greater detail in FIGS. 2 and 3 the first personal computing device 10 is implemented as a wearable electronic device. The first personal computing device 10 comprises a housing 11 and numerous sensors 20, 22, 24, 26, 28. The first personal computing device 10 comprises a collar 12 allowing to attach the personal computing devices 10 to a wrist of the user 1. In this way, the personal computing device 10 can be permanently worn by the user 1.

The personal computing device 10 further comprises an electronic storage 16 and a processor 14. Moreover, the first personal computing device 10 comprises a communication interface 40. By way of the communication interface 40, the personal computing device 10 may communicate with the further, hence with the second personal computing device 100. With typical examples the first personal computing device 10 is operable to gather vital a data 400 of the user by making use of at least one of the sensors 20, 22, 24, 26, 28. The sensors 20, 22, 24, 26, 28 are connected to the processor 14.

Signals generated by the sensors 20, 22, 24, 26, 28 can be at least processed or pre-processed by the processor 14. At least one of the sensor signals, processed sensor signals or preprocessed sensor signals can be at least temporally stored in the electronic storage 16 of the first personal computing device 10. The processor 14 is further connected to the communication interface 40. In this way, signals, processed signals or preprocessed signals as obtained from at least one of the sensors 20, 22, 24, 26, 28 can be transmitted and communicated to at least to the second personal computing device 100.

For this, the second personal computing device 100 comprises a communication interface 140. The communication interface 40 and the communication interface 140 are configured to set up and/or to establish a wireless communication link between the personal computing device 10 and the personal computing device 100.

The numerous sensors 20, 22, 24, 26, 28 are configured to measure at least one of the following vital parameters: heart rate, breathing rate, blood glucose level, electrocardiogram, oxygen saturation, temperature, position, state of movement, orientation, acoustic feedback and/or haptic feedback of the user 1. For instance, the sensor 20 may be implemented as a position sensor. It may comprise a magnetic field sensor by way of which the orientation of the personal computing device 10 in relation to the ambient magnetic field can be determined. The sensor 22 may be implemented as an acceleration sensor. The sensor 22 may thus provide information about the state of movement of the personal computing device 10. The sensor 24 may be implemented as a heart rate sensor. The sensor 26 may be implemented as a temperature sensor and the sensor 28 may be implemented as a ECG sensor.

With other examples the sensor 24 is implemented as a blood glucose sensor. Especially when the first personal computing device 10 is worn by a user the sensor 24 may be in contact with the skin of the user 1. It may permanently or regularly penetrate the outer skin of the user. The sensor 24 may be configured for continued glucose measurement. The sensor 24 and/or the personal computing device 10 may be configured to measure and/or to transmit measured data to at least one of the second personal computing device 100, to the external service provider 202, to the electronic storage 222 and/or to the emergency service provider 300.

With some examples and when the sensor 24 is implemented as a glucose measurement sensor the sensor 24 is integrated in the first personal computing device 10. With other examples the sensor 24 is a separate sensor unit configured to communicate with at least one of the first personal computing device 10 and the second personal computing device 100. The sensor 24 may be encapsulated in a separate housing and may comprise a wireless transmitter configured to communicate with at least one of the first personal computing device 10 and the second personal computing device 100. The sensor 24 and/or the first personal computing device 10 may be configured to measure and/or to determine the blood glucose level of the user in regular time intervals, e.g. in accordance to a predefined schedule.

The first personal computing device 10 may be configured as a fitness tracker or as a smart watch. It may comprise a blood glucose measurement sensor 24 or it may wirelessly communicate with a separate blood glucose measurement sensor 24 being e.g. in permanent or regular contact with the skin of the user 1 or being at least temporarily implanted in or below the skin of the user.

In addition to the numerous sensors the personal computing device 10 may further comprise at least one indicator 30. The indicator 30 may be implemented as a visual, audible or haptic indicator. Hence, the indicator 30, typically connected to the processor 14 may comprise at least one of a light source, a speaker and a buzzer or combinations thereof in order to give at least one of a visual acoustic or haptic feedback to the user 1.

The first personal computing device 10 is particularly configured to measure, record and/or to gather vital data of the user 1. The gathered vital data can be either stored in the storage 16 and can be processed by the processor 14 of the same personal computing device 10. In combination with a second personal computing device the vital data gathered by the first personal computing device 10 can be transmitted at least in part to the second personal computing device 100. The second personal computing device 100 comprises a housing 101 and a processor 110. The second personal computing device 100 further comprises a storage 120 connected to the processor 110. The second personal computing device 100 comprises a communication interface 140 configured to communicate with the communication interface 40 of the first personal computing device 10.

The second personal computing device 100 further comprises at least one of a microphone 150 and a speaker 160. In this way, the user 1 may directly communicate with the second personal computing device 100 by way of natural language or dedicated voice commands. The microphone 150 and the speaker 160 are connected to the processor 110. The second personal computing device 100 further comprises another communication interface 142 operable to communicate with a communication interface 240 of an external electronic device 200, e.g. provided by an external service provider 202. The second personal computing device 100 may comprise a further communication interface 144 particularly configured to communicate with a communication interface 340 of the emergency service provider 300. T The numerous communication interfaces 140, 142, 144 may be implemented by separate and different hardware components or by one and the same hardware component. The communication interfaces 140, 142, 140 or may be implemented as wireless communication interfaces and/or as wired communication interfaces depending on the specific configuration of the user environment 5 and the available access to a communication network 180 such as the Internet. Communication between the communication interfaces 142 and 240 as well as the communication between communication interfaces 144 and 340 may be provided by one and the same communication network 180 or by different communication networks depending on the specific implementation of the respective communication link. The communication link between the second personal computing device 100, the external service provider 202 and the emergency service provider 300 may be implemented as an analog communication link or as a digital communication link.

With some examples the first personal computing device 10 is configured to communicate directly with at least one of the external electronic device 200 of the external service provider 202 and the emergency service provider 300. Here, the communication interface 40 of the first personal computing device 10 is configured to communicate with at least one of the communication interfaces 240, 340 of the external electronic device 200 and the emergency service provider 300, typically via the communication network 180. With this example the emergency management system 80 may be void of the second personal computing device 100.

The drug delivery device 50 may also comprise a communication interface 52. The communication interface 52 may be configured to communicate with at least one of the communication interfaces 40, 140, 142, 144 of the first or second personal computing devices 10, 100. Typically, the communication interface 52 is configured as a wireless communication interface to set up a communication link at least with the wireless communication interface 140 of the second personal computing device 100.

As illustrated by the combination of FIGS. 2 and 3 the external service provider 202 comprises an external electronic device 200. The external electronic device 200 may be the implemented as a stationary data processing center. The external electronic device 200 comprises a processor 210 and an internal electronic storage 220. The external electronic device 200 further comprises a communication interface 240 in order to communicate with the communication interface 142 of the second personal computing device 100. The external electronic device 200 further comprises a communication interface 242 to communicate with a separate or external electronic storage 222. The electronic storage 222 may be implemented as a database, to which the external electronic device 200 has permanent access.

The external electronic device 200 further comprises another communication interface 244. The communication interface 244 may be implemented to communicate directly with a communication interface 342 of the emergency service provider 300.

With some examples the emergency management system 80 comprises a user dialog system 250. The dialog system 250 may comprise a speech interface 146 implemented or provided by the second personal computing device 100 and a further speech interface 246 implemented or provided by the external electronic device 200. The speech interfaces 146, 246 may mutually complement or may correspond to each other. The speech interfaces 146, 246 are configured to exchange data via the communication link connecting the communication interface 142 with the communication interface 240.

At least one of the electronic storages 16, 120, 220, 222 is configured to store personal data 500 of the user 1. The personal data 500 comprises at least one of the following data: age, gender, weight, address information of the user, type of disease, prescribed medication, medication history, treatment history and/or emergency history of the respective user 1. The personal data 500 or portions thereof is stored in at least one of the electronic storages 16, 120, 220 and 222.

The personal data 500 is made available to at least one of the processor 14, 110, 210 in order to derive an emergency level indicator on the basis of the gathered vital data 400 and the personal data 500. The respective processor 14, 110, 210 has also access to the vital data 400 gathered by the personal computing device 10.

The at least one processor is 14, 110, 210 is configured to derive, to calculate or to estimate an emergency level indicator on the basis of the personal data 500 of the user 1 and the gathered vital data 400 of the same user 1. By appropriately processing the vital data 400 and the personal data 500 the at least one processor 14, 110, 210 and/or a respective computer program deployed in the processor 14, 110, 210 provides the emergency level indicator being indicative of an emergency level the user is exposed to or which the user is actually suffering.

The specific implementation of the emergency management system 80 may vary. With some examples the entire emergency management system 80 is integrated into the first personal computing device 10. Here, the personal computing device 10 is configured to directly communicate with the emergency service provider 300. Then, the electronic storage 16 providing the personal data 500 may also temporarily store the acquired or gathered vital data 400 as provided by the numerous sensors 20, 22, 24, 26, 28.

Here, the processor 14 is configured to derive the emergency level indicator on the basis of the gathered vital data 400 and on the basis of the personal data 500. The personal data 500 is provided by the electronic storage 16. The vital data 400 is provided by at least one of the numerous sensors 20, 22, 24, 26, 28.

When the processor 14 determines or derives an emergency level indicator above a predefined upper threshold it may autonomously initiate generation of an emergency request and transmitting of the emergency request via the communication interface 40 directly to the emergency service provider 300. Generation and/or transmission of the emergency request may be accompanied by a user-detectable activation of the indicator 30. The personal computing device 10 may further comprise an input 32, e.g. implemented as a button or as a touch sensitive area on or inside the housing 11 of the personal computing device 10.

By way of the input 32, the user may overrule an automated emergency request generation and/or automated emergency request transmission to the emergency service provider 300. In a typical scenario the personal computing device 10 may derive an emergency level indicator on the basis of the personal data 500 and on the basis of the gathered vital data 400, which emergency level indicator is above the predefined upper emergency threshold. The personal computing device 10 may be hence configured to activate the indicator 30 for a predefined time interval, thereby indicating to the user 1, that the personal computing device 10 is about to submit an emergency request to the emergency service provider 300.

The user 1 is given then the possibility to interact with the input 32 in order to overrule the automated emergency request and/or to confirm the automated emergency request. By activating, e.g. by depressing the input 32 the user may be further given the possibility to manually trigger generation and submission of an emergency request to the emergency service provider 300. In this way, the user 1 is given the possibility to call for help even in situations, in which the emergency level indicator is below a predefined upper or lower emergency threshold.

With some other examples the emergency management system 80 includes the first personal computing device 10 and the second personal computing device 100. There, the first personal computing device 10 is particularly dedicated and configured to gather and to provide vital data 400 of the user to the second personal computing device 100. The local electronic storage 16 of the first personal computing device 10 may be used to temporally store data, e.g. preprocessed vital data as provided by at least one of the sensors 20, 22, 24, 26, 28. This may be of particular use in situations, where a communication link between the communication interface 40 and the communication interface 140 should be temporarily disrupted or should be unavailable.

The personal data of the user may be stored in one of the electronic storages 120, 220, 222. When the personal data 500 is stored in the electronic storage 120 of the second personal computing device 100 the processor 110 of the second personal computing device 100 is configured to process the personal data 500 as provided by the electronic storage 120 in combination with the vital data of 400 as obtained via the communication interface 140 from the first personal computing device 10.

With this example the second personal computing device 110 is configured to derive the emergency level indicator on the basis of processing of the personal data 500 and the gathered vital data 400. Depending on the derived emergency level the processor 110 is configured to generate the emergency request and/or to transmit the emergency request to the emergency service provider 300, e.g. via the communication interface 144. For the purpose of processing of the personal data 500 and the gathered vital data 400 the second personal computing device 100 may be configured to communicate with the external service provider 202 via the communication interface 142.

With some other examples the emergency management system 80 only includes the second personal computing device 100 and is void of a first personal computing device 10. Then, the vital data 400 is collected by the second personal computing device 100. For this, also the second personal computing device 100 may comprise at least one of the sensors 20, 22, 24, 26, 28 configured to measure at least one of the following parameters: heart rate, breathing rate, blood glucose level, blood pressure, electrocardiogram (ECG), oxygen saturation, temperature, position, state of movement, orientation, acoustic feedback, haptic feedback currently described in connection with the first personal computing device 10. The second personal computing device 100 may be configured as a wearable electronic device. It may comprise a smart phone or a smart watch.

With this embodiment as well as with examples of the emergency management system including a first personal computing device 10 and a second personal computing device 100 the second personal computing device may be implemented as a smart watch or smart phone and may be provided with a diabetes management software application, e.g. a diabetes management app. The second personal computing device 100 may receive blood glucose level data of the user 1 from the first personal computing device 10, e.g. by a wireless communication link. The second personal computing device 100 may further receive data from the drug delivery device 50. The data from the drug delivery device 50 may be indicative of the amount of a medicament currently or recently administered to the user 1.

Optionally and in addition to the gathering of vitality data 400 from the first personal computing device 10 and gathering of personal data 500 from the drug delivery device 50 at least one of the first and second personal computing devices 10, 100 is further operable to collect and/or to transmit data regarding the current physical activity, position and/or orientation of the user. For instance and for a precise position determination of the user 1 generally available or stored position data of the Wi-Fi environment of the user 1 and/or momentary GPS data derivable by at least one of the first and second personal computing device 10, 100 may be further used.

Based on the data received from the drug delivery device 50 being indicative of the current or recent medicament administering step and based on blood glucose level data received from the first personal computing device 10, and further optionally, based on supplemental vital data 400 as received or gathered by one of the first and second personal computing devices 10, 100 a rather precise emergency level indicator with a subsequent generation of an emergency request can be derived, generated and/or provided.

For instance, the second personal computing device 100 may provide or comprise a user dialog system 250 allowing to communicate with the user 1 on the basis of natural language processing and/or natural language recognition. For interpreting a speech sequence uttered by the user 1 and recorded or received by the microphone 150 the second personal computing device 100, e.g. the inbuilt speech interface 146 may communicate with the external electronic device 200 and/or with the speech interface 246 of the external service provider 202. Implementing of a dialog with the user is of particular use when the emergency level is above a lower emergency threshold.

So before generating and transmitting the emergency request to the emergency service provider 300 the second personal computing device 100, e.g. its processor 210 may be configured to enter a dialog with the user 1 in order to specify the present issue or a potential emergency event in more detail. The user dialog may be triggered autonomously, e.g. by the processor 110 once the emergency level indicator exceeds a predefined lower emergency threshold. In order to characterize the emergency issue the dialog system may be configured to confront the user with a sequence of questions that have to be answered by the user appropriately.

Here, the user dialog system 250 may be implemented to enter a multistep cascade or to conduct numerous escalation stages. At a first stage the dialog system may ask the user 1 to specify a potential emergency issue. Here, the user may be prompted to spell his name, the present day or time of the day. If the user fails to respond or responds in an inappropriate manner that does not match with the correct answer the user dialog system 250 may enter a subsequent escalation stage.

In a subsequent or second escalation stage of the user dialog the questions addressed to the user 1 may be pronounced with higher intensity, e.g. with increased brightness when provided visually or with increased sound volume in case of an acoustic dialog.

Moreover, in a second or subsequent escalation state the questions may be simplified compared to the questions provided in or during a first or initial escalation stage. In this way, the user should be given the possibility to provide a clear and unequivocal response. A repeated failure to respond or failure to respond in an adequate manner may invoke a further, e.g. a third escalation stage of the user dialog system.

Here, the emergency management system may establish a direct communication between the second personal computing device 100 and the emergency service provider 300. Alternative or in a further escalation stage the personal computing device 100 may be configured to generate and to transmit the emergency request to the emergency service provider 300.

Moreover, the emergency management system can be implemented with a number of different sensitivity levels. A particular sensitivity level may be individually assigned to a particular user of the emergency management system 80. The sensitivity level may depend on the degree of disease and the likelihood of an emergency situation that may be caused by the degree of the disease. By way of example and with a user suffering Diabetes Type II the user may be categorized in one of numerous available sensitivity levels or severity levels.

In a first level, the user is subject to diabetes education and lifestyle change. He should take care of a weight loss, he should regularly exercise, he should change his diet and/or should cease to smoke. In a second level of Diabetes the user may undergo a monotherapy with an oral anti-diabetic. In a further or third level the user may undergo a therapy making use of a combination of two or more anti-diabetics or insulin. In a further level, e.g. in a fourth level, the user may undergo an insulin therapy, possibly in combination with oral antidiabetic.

Here, with an increasing level, the more likely will be a derailment of the metabolism of the user. With an increasing level of the treatment of the user the sensitivity level of the emergency management system may increase. The higher the level, the more sensitive the emergency management system will be with regards to the processing of personal data 500 and vital data 400 the deriving, generation or estimation of an emergency level indicator or emergency request. The higher the sensitivity level will be, the lower will be the threshold(s) for the emergency level indicator and/or for the generation of an emergency request. Generally and for each generation and transmission of an emergency request to the emergency service provider 300 the emergency request may include at least one or numerous of the gathered vital data or personal data of the user 1. In this way, the emergency service provider 300 is immediately informed about relevant vital parameters or personal data.

For conducting of a dialog with the user 1, the second personal computing device 100 may communicate with the external service provider 202, in particular with the external electronic device 200 and/or with the electronic storage 222, e.g. implemented as a database. This is of particular use in order to provide a high-level and rather accurate speech recognition, especially when the user dialog system 250 is implemented as a speech-based dialog system.

With some examples and for submitting of an emergency request to the emergency service provider 300 there may be also provided a communication link between a communication interface 244 of the external electronic device 200 and the communication interface 342 of the emergency service provider 300. This may be of particular benefit, when the personal computing device 100 is void of a separate communication interface 144 configured to communicate with the emergency service provider 300 directly.

With such an example it is only required and necessary that the personal computing device 100 exclusively communicates with the external electronic device 200. Here, an emergency request can be generated by the personal computing device 100 and can be transmitted to the emergency service provider 300 via the external electronic device 200.

With some further examples the second personal computing device 100 may be simply used as a communication hub to provide data transmission between the first personal computing device 10 and the external electronic device 200 and/or the emergency service provider. Here, processing of the gathered vital data 400 and of the personal data 500 may be provided and conducted by the processor 210 of the external electronic device 200. In this way, computational demands and computational power for the processor 120 and the processor 14 can be reduced to a minimum. This has also the benefit, that eventual software updates do not have to be conducted with the personal computing devices 10, 100, wherein such software update provide ongoing, latest or recent developments in terms of deriving of emergency level indicators. With such examples, the personal data 500 may be stored in the electronic storage 220 of the external electronic device 200 and/or in the database 222.

This has the further benefit, that personal data, in particular data with regards to the type of disease, prescribed medication, medication history, treatment history or emergency history can be updated by numerous external entities, such as the external service provider 202. Hence, the external service provider 202 may be one of a healthcare provider or pharmaceutical manufacturer.

Through the data link between the emergency service provider 300 and the external electronic device 200, e.g. the communication link between the emergency service provider 300 and the external service provider 202 there can be provided immediate feedback from the emergency service provider 300 with regard to the treatment history and the emergency history of a particular user 1, especially after an emergency request has been transmitted to and processed by the emergency service provider 300. According to the feedback from the emergency service provider 300 the personal data and/or an algorithm configured to derive the emergency level indicator may be adapted or modified accordingly.

Figure 4:
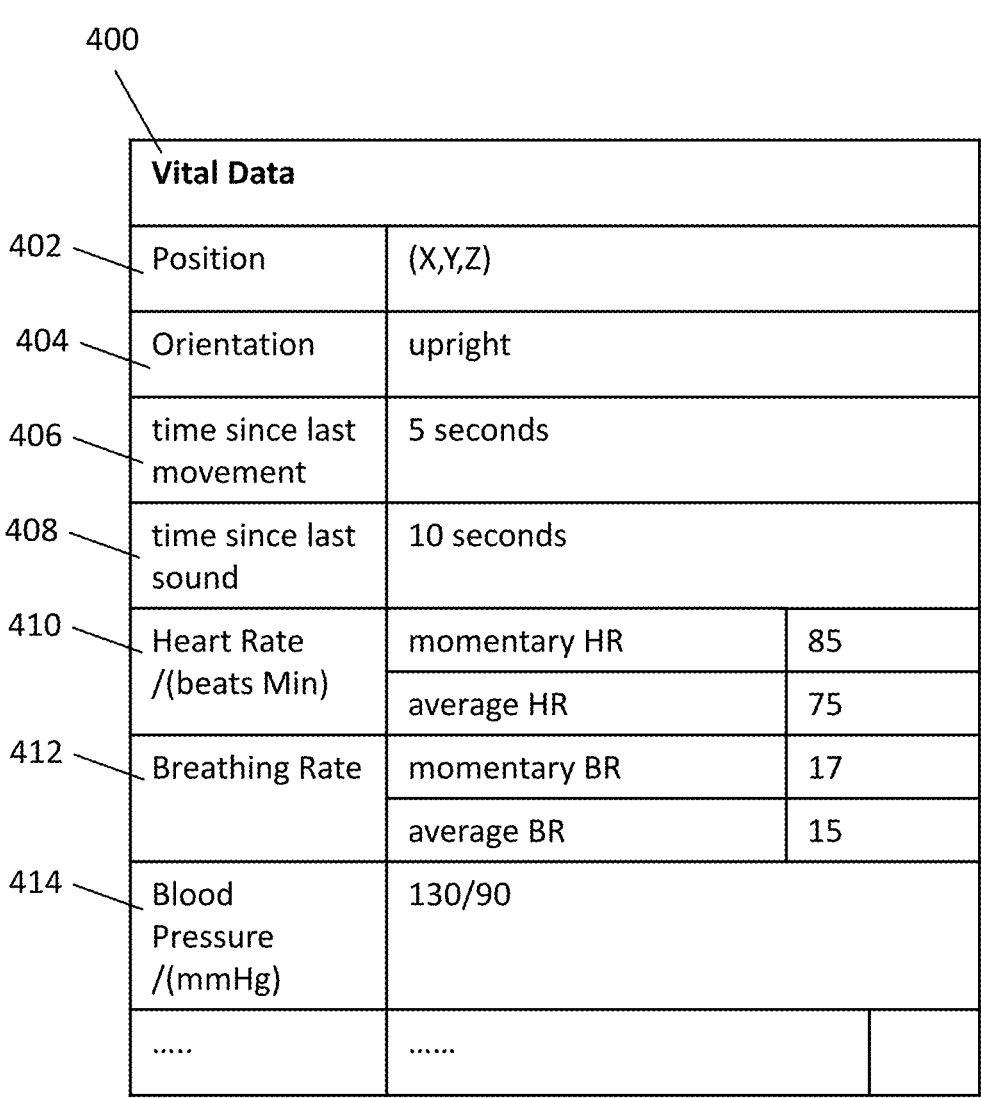
FIG. 4 is illustrative of one example of a data structure of vital parameters.

In FIG. 4, an example of a set of vital data captured and/or gathered by the personal computing device 10 is illustrated. The vital data 400 comprises numerous data fields 102, 404, 406, 408, 410, 412, 414. As illustrated by way of example, in FIG. 4 the data field 402 is indicative of the position or location of the user 1. It may indicate the momentary position or place where the user 1 is located. The data field 404 is indicative of the orientation of the user 1. As shown in the example of FIG. 4, the user is in an upright position. The data field 406 is indicative of a current state of movement. Here, and by way of example it is indicated that the user has not moved during the last five seconds. The data field 408 is indicative of potential noises or sound signals emanating from the user. Here and by way of example it is indicated, that during the last 10 seconds the user 1 has not generated any audible sounds.

In the data field 410 a heart rate of the user 1 is illustrated. Here, the data field 410 is divided in a momentary heart rate, that equals to 85 beats per minute (bpm). There is further provided a data field representing an average heart rate over a predefined time interval, e.g. during the last hour or the last day. As indicated in the example, the momentary heart rate of 85 bpm is slightly above the average heart rate, which is 75 bpm. In the further data field 412 a breathing rate is indicated. There, a momentary treating rate is shown to be 17 strokes per minute compared to an average breathing rate of 15 strokes per minute. In the further data field 414 a momentary and/or average blood pressure is indicated.

For the estimation or deriving of an emergency level indicator at least one or several data fields 402, 404, 406, 408, 410, 412, 414 are processed by at least one of the above illustrated processors 14, 110, 210. The respective processor 14, 110, 210 also has access to or is provided with personal data 500 as illustrated in the example of FIG. 5. Typically, the personal data comprises a data field 502 indicating the age of the respective person. The data field 504 indicates the gender of the user 1. The data field 506 is indicative of the actual weight of the person. In the data field 508, the type of disease that are known to the respective person are indicated. There, different types of diseases, such as cardiovascular disease, a metabolic disease or respiratory defects are each provided with an indicator, e.g. represented by an index or number. The larger the index or number the more the respective disease or issue will apply to the respective user. Of course, the personal data 500 of each user 1 is provided with a unique identifier by way of which the personal data 500 can be assigned to a particular user among a plurality of users.

In the further data field 510 prescribed medication is indicated. Here, numerous medicaments as identified by a medicament name might be listed. For each medicament the amount of medicament and the prescription schedule is indicated in the data field 510. When the emergency management system 80 is equipped with a drug delivery device 50 configured to communicate with at least one of the personal computing device 10, 100 and the external service provider 202 a medication history might be recorded in the data field 512 as a medication history. The medication history data field 512 provides storage at which time or date a well-defined amount of a particular medicament has been administered to the user. The medication history data field 512 may be further indicative whether an intake of a particular medicament has been confirmed either passively or actively by the user 1. In the further data field 514 an emergency history of a particular user is documented or recorded. Here, the type of emergency event as well as the time or date of such previous emergency events is recorded.

The personal data 500 is processed and evaluated in combination with the vital data 400 by at least one of the processors 14, 110, 210 in order to derive or to calculate an emergency level indicator. The emergency level as expressed by the emergency level indicator is useful to classify the degree of emergency as well as to distinguish between different types of emergency issues, e.g. whether it represents a severe issue or a comparatively harmless emergency situation. In addition, the emergency request generated by the at least one processor 14, 110, 210 may be provided with further valuable information representing personal data 500 of the respective person as well as actually measured vital parameters 400 of the respective person 1.

Figure 6:
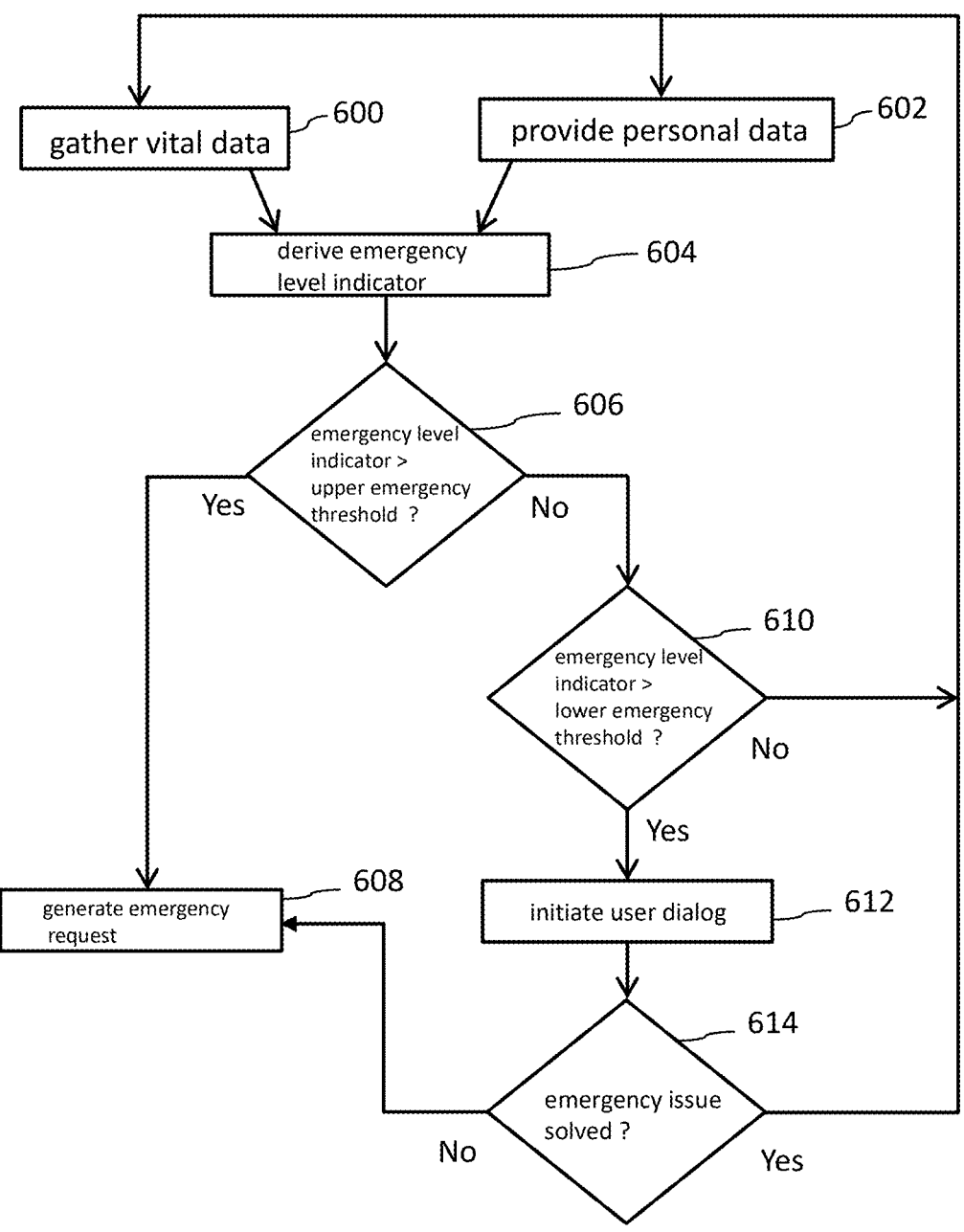

In FIG. 6 an example of a method to initiate an emergency request is illustrated by way of a flowchart. In an initial step 600 there is gathered vital data 400 of a person 1. In a parallel step 602 there is provided personal data 500 of the same person 1. Based on the gathered vital data 400 and the provided personal data 500 in subsequent step 604 at least one of the processors 14, 110, 210 derives an emergency level indicator. In a subsequent step 606 the derived emergency level indicator is compared to an emergency threshold. For instance, in step 606 the derived emergency level indicator is compared to an upper emergency threshold. If the emergency level indicator is above the predefined upper emergency threshold in step 606 the method directly continues with step 608, in which an emergency request is generated and transmitted to the emergency service provider 300.

Here, and before transmitting such an emergency request to the emergency service provider 300 there might optionally given the possibility to the user 1 to interrupt or to overrule the emergency request. Hence, an indicator 30 of the first personal computing device 10 or a respective indicator, e.g. a speaker 160 of the second personal computing device 100 may prompt the user 1 to confirm or to abort the transmission of the emergency request to the emergency service provider 300 during a predefined time interval.

If in step 606 the derived emergency level indicator is less than or equal to the upper emergency threshold the method continues with step 610. In step 610 the emergency level indicator is compared with a predefined lower emergency threshold. If the emergency level indicator is below the predefined lower emergency threshold the method returns to steps 600 and 602. Here and accordingly, the method continues with gathering vital data 400 of the user 1. The loop of the steps 600, 602, 604, 606, 610 is conducted as long as one of the comparisons in step 606, 610 reveals that the emergency level indicator is equal to or above one of the outer emergency threshold or lower emergency threshold.

If in step 610 it turns out that the emergency level indicator is above the predefined lower emergency threshold the method continues with step 612. In step 612 the method initiates a user dialog with the user 1. The user dialog may be conducted visually and/or acoustically by the user dialog system 250. For this, a content-based dialog system may start to ask a sequence of questions to the user 1 and prompt the user 1 to respond accordingly. Depending on the response of the user 1 the dialog system 250 may execute numerous escalation stages.

At the end the user dialog system 250 terminates in step 614. There, it is assessed whether the present emergency issue has been solved. In that case and when correspondingly confirmed by the user 1 the method returns to steps 600 and/or 602. In the other case and when the emergency issue has not been solved by the user dialog the method continues with step 608. Accordingly, an emergency request is generated and transmitted to the emergency service provider 300.

REFERENCE NUMBERS 1 user
5 user environment
10 personal computing device
11 housing
12 collar
13 belt
14 processor
16 electronic storage
20 sensor
22 sensor
24 sensor
26 sensor
28 sensor
30 indicator
32 input
40 communication interface
50 delivery device
52 communication interface
80 emergency management system
100 personal computing device
101 housing
110 processor
120 storage
140 communication interface
142 communication interface
144 communication interface
146 speech interface
150 microphone
160 speaker
180 communication network
200 external electronic device
202 service provider
210 processor
220 electronic storage
222 electronic storage
240 communication interface
242 communication interface
244 communication interface
246 speech interface
250 dialog system
300 emergency service provider
340 communication interface
342 communication interface
400 vitality data
402 data field
404 data field
406 data field
408 data field
410 data field
412 data field
414 data field
500 personal data
502 data field
504 data field
506 data field
508 data field
510 data field
512 data field
514 data field
600 user dialog system

The invention claimed is:

1. An emergency management system configured to initiate an emergency request, the emergency management system comprising:

a personal computing device configured to gather vital data of a user, the personal computing device comprising at least one communication interface operable to communicate with at least one of an external electronic device or an emergency service provider;

an electronic storage configured to store personal data of the user;

a medicament delivery device comprising a communication interface configured to communicate with the personal computing device and configured to provide medication history data to the personal computing device, wherein the medication history data is indicative of an amount and type of medicaments administered to the user in the past by the medicament delivery device; and at least one processor connectable to the electronic storage and the personal computing device, the at least one processor being operable to:

receive the gathered vital data and medication history data of the user from the personal computing device and personal data of the user from the electronic storage;

process, based on an emergency level derivation algorithm, the gathered vital data, the medication history data, and the personal data to derive an emergency level indicator; and generate an emergency request and transmit the emergency request to the emergency service provider in response to an increase of the emergency level indicator above a predefined upper emergency threshold, wherein the emergency request includes at least a part of the medication history data;

wherein the emergency management system further comprises a user dialog system operable to enter into a user dialog with the user, wherein the at least one processor is configured to initiate the user dialog system when the emergency level indicator exceeds a predefined lower emergency threshold, wherein when the user shows an appropriate or expected reaction during an interaction with the user dialog system, the at least one processor is operable to decrease the emergency level indicator, and wherein when the user shows an inappropriate or unexpected reaction during the interaction with the user dialog system, the at least one processor is operable to increase the emergency level indicator, wherein the user dialog system is operable to provide numerous escalation stages and wherein when in an initial or first escalation stage and when in a first communication loop with the user, the user dialog system is operable to enter into a second escalation stage when the reaction of the user in the first escalation stage is inappropriate or unexpected, and wherein the at least one processor is configured to execute a self-learning algorithm to modify the emergency level derivation algorithm based on feedback of the user.

2. The emergency management system according to claim 1, wherein generation and transmission of the emergency request include providing at least some of the gathered vital data and at least some of the personal data to the emergency service provider.

3. The emergency management system according to claim 1, wherein deriving of the emergency level indicator comprises a probabilistic analysis of gathered vital data based on the personal data.

4. The emergency management system according to claim 3, wherein the electronic storage and the at least one processor are operable and configured to gather vital data over time and to derive time averaged vital data of the user and wherein the probabilistic analysis of gathered vital data is based on the time averaged vital data of the user.

5. The emergency management system according to claim 1, wherein the personal computing device comprises at least one sensor operable to measure at least one of the following vital parameters: a heart rate, a breathing rate, a blood glucose level, a blood pressure, an electrocardiogram (ECG), oxygen saturation, a temperature, a position, a state of movement, an orientation, acoustic feedback, and haptic feedback.

6. The emergency management system according to claim 1, wherein the personal data comprises at least one of the following data: age, gender, weight, address information, type of disease, prescribed medication, medication history, treatment history, and emergency history.

7. The emergency management system according to claim 1, wherein the at least one processor is configured to continuously gather the vital data and to continuously derive the emergency level indicator, wherein the at least one processor is further configured to autonomously generate and to transmit an emergency request to the emergency service provider when the emergency level indicator exceeds a predefined upper emergency threshold.

8. The emergency management system according to claim 1, wherein at least one of the user dialog system or the at least one processor is operable to modify the emergency level indicator based on a response of the user in or during the user dialog.

9. The emergency management system according to claim 1, wherein the user dialog system is operable to deactivate autonomously when the reaction of the user in the first escalation stage is appropriate or expected.

10. The emergency management system according to claim 9, wherein the processor is operable to raise the emergency level indicator when the user dialog system enters the second escalation stage from the first escalation stage.

11. The emergency management system according to claim 1, wherein the processor is operable to derive the emergency level indicator, comprising evaluating a medication context from the medication history data including time since the last administration and an administered amount.

12. A personal computing device configured to initiate an emergency request, the personal computing device comprising:

a processor operable to gather and to process vital data of a user;

an electronic storage connected to the processor and being operable to store at least one of vital data and personal data of the user; and at least one communication interface connected to the processor, the at least one communication interface being operable to (i) receive medication history data from a drug delivery device and (ii) transmit an emergency request to an emergency service provider, the medication history data being indicative of an amount and type of medicaments administered to the user in the past by the drug delivery device, wherein the processor being operable to:

receive the gathered vital data and medication history data of the user from the personal computing device and personal data of the user from the electronic storage, process, based on an emergency level derivation algorithm, the gathered vital data, the medication history data, and the personal data to derive an emergency level indicator, generate the emergency request based on the emergency indicator and to include at least a part of the medication history data in the emergency request, and transmit the emergency request to the emergency service provider in response to an increase of the emergency level indicator above a predefined upper emergency threshold;

wherein the personal computer device further comprises:

a user dialog system comprising a speech interface configured to process a speech-based input or speech-based feedback of the user, wherein the processor is configured to initiate the user dialog system when the emergency level indicator exceeds a predefined lower emergency threshold, wherein when the user shows an appropriate or expected reaction during an interaction with the user dialog system, the processor is operable to decrease the emergency level indicator, and wherein when the user shows an inappropriate or unexpected reaction during the interaction with the user dialog system, the processor is operable to increase the emergency level indicator, wherein the user dialog system is operable to provide numerous escalation stages and wherein when in an initial or first escalation stage and when in a first communication loop with the user, the user dialog system is operable to enter into a second escalation stage when the reaction of the user in the first escalation stage is inappropriate or unexpected, and wherein the processor is configured to execute a self-learning algorithm to modify the emergency level derivation algorithm based on feedback of the user.

13. The personal computing device according to claim 12, wherein the personal computing device is configured as a wearable electronic device and comprises at least one sensor operable to measure at least one of the following vital parameters: a heart rate, a breathing rate, a blood glucose level, a blood pressure, an electrocardiogram (ECG), an oxygen saturation, a temperature, a position, a state of movement, an orientation, acoustic feedback, and haptic feedback.

14. A computer-implemented method of initiating an emergency request, the computer-implemented method comprising:

gathering, by a wearable electronic device, vital data of a user;

providing, by one of a drug delivery device and an add-on device attached to the drug delivery device, medication history data of the user, the medication history data being indicative of an amount and type of medicaments administered to the user in the past by the drug delivery device;

obtaining personal data of the user from an electronic storage;

receiving the gathered vital data of the user from the wearable electronic device;

receiving the medication history data of the user from the drug delivery device;

receiving the personal data of the user from the electronic storage;

processing, based on an emergency level derivation algorithm, the gathered vital data, the medication history data, and the personal data;

deriving an emergency level indicator based on the personal data, the gathered vital data and the medication history data;

generating an emergency request based on the emergency level indicator and including at least a part of the medication history data in the emergency request;

transmitting the emergency requests to an emergency service provider in response to an increase of the emergency level indicator above a predefined upper emergency threshold;

initiating, by a user dialog system, a dialog with the user when the emergency level indicator exceeds a predefined lower emergency threshold, wherein when the user shows an appropriate or expected reaction during an interaction with the user dialog system, decreasing the emergency level indicator, and wherein when the user shows an inappropriate or unexpected reaction during the interaction with the user dialog system, increasing the emergency level indicator;

providing numerous escalation stages of the user dialog system and when in a first communication loop with the user and when in an initial or first escalation stage, entering from the initial or first escalation stage into a second escalation stage when the reaction of the user in the first escalation stage is inappropriate or unexpected, and executing a self-learning algorithm using at least one processor to modify the emergency level derivation algorithm based on a feedback of the user.

15. The computer-implemented method of claim 14, wherein generating the emergency request includes providing at least some of the gathered vital data and at least some of the personal data to the emergency service provider.

16. The computer-implemented method of claim 14, wherein the vital data is continuously gathered by the wearable electronic device and wherein the generation and/or transmission of the emergency request is triggered autonomously based on the gathered vital data.

17. The computer-implemented method of claim 14, further comprising modifying the emergency level indicator depending on a response of the user in or during the user dialog.

18. A non-transitory computer readable storage medium storing one or more programs, the one or more programs comprising instructions, which when executed by a personal computing device, cause the personal computing device to perform operations comprising:

gathering vital data of a user;

providing medication history data of the user, wherein the medication history data is indicative of an amount and type of medicaments administered to the user in the past by a medicament delivery device;

providing personal data of the user from an electronic storage;

receiving the gathered vital data of the user from a wearable electronic device, receiving the medication history data of the user from the medicament delivery device, and receiving the personal data of the user from the electronic storage, processing, based on an emergency level derivation algorithm, the gathered vital data, the medication history data, and the personal data, and deriving an emergency level indicator based on the personal data, the gathered vital data, and the medication history data;

generating an emergency request based on the emergency level indicator and including at least a part of the medication history data in the emergency request;

transmitting the emergency request to an emergency service provider in response to an increase of the emergency level indicator above a predefined upper emergency threshold; and initiating a dialog with the user via a user dialog system when the emergency level indicator exceeds a predefined lower emergency threshold, wherein when the user shows an appropriate or expected reaction during an interaction with the user dialog system, decreasing the emergency level indicator, and wherein when the user shows an inappropriate or unexpected reaction during the interaction with the user dialog system, increasing the emergency level indicator, providing numerous escalation stages of the user dialog system and when in a first communication loop with the user and when in an initial or first escalation stage, entering from the initial or first escalation stage into a second escalation stage when the reaction of the user in the first escalation stage is inappropriate or unexpected, and executing a self-learning algorithm using at least one processor to modify the emergency level derivation algorithm based on feedback of the user.

19. The non-transitory computer readable storage medium of claim 18, wherein the operations further comprise: entering into a dialog with the user when the emergency level indicator exceeds a predefined lower emergency threshold.

20. The non-transitory computer readable storage medium of claim 18, wherein the operations further comprise: modifying the emergency level indicator depending on a response of the user in or during the user dialog.

* * * * *